Figure 25:
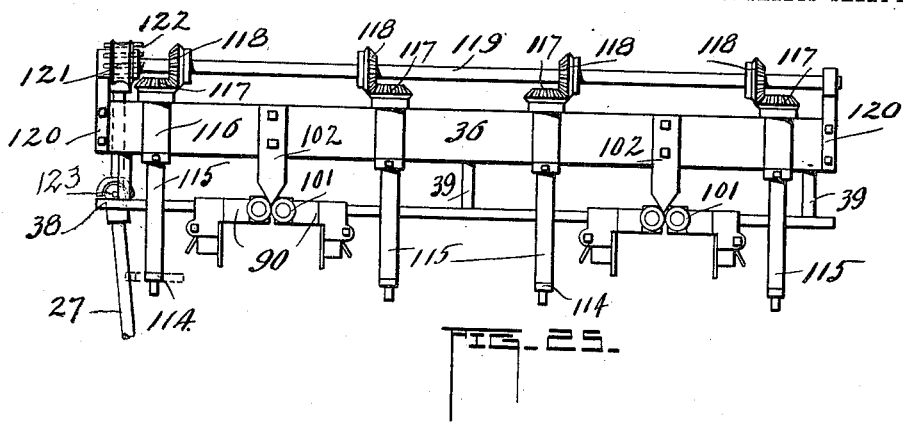

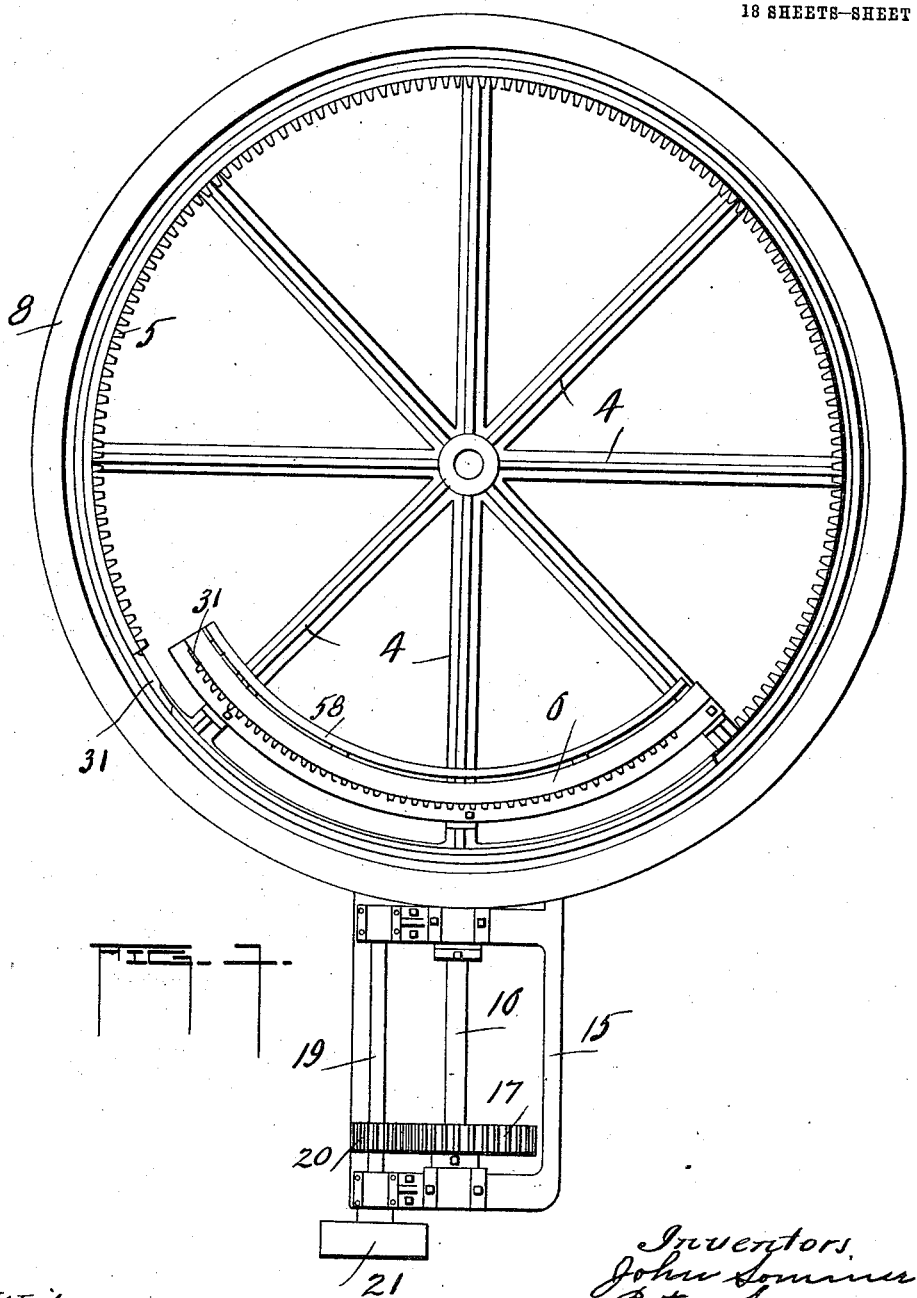

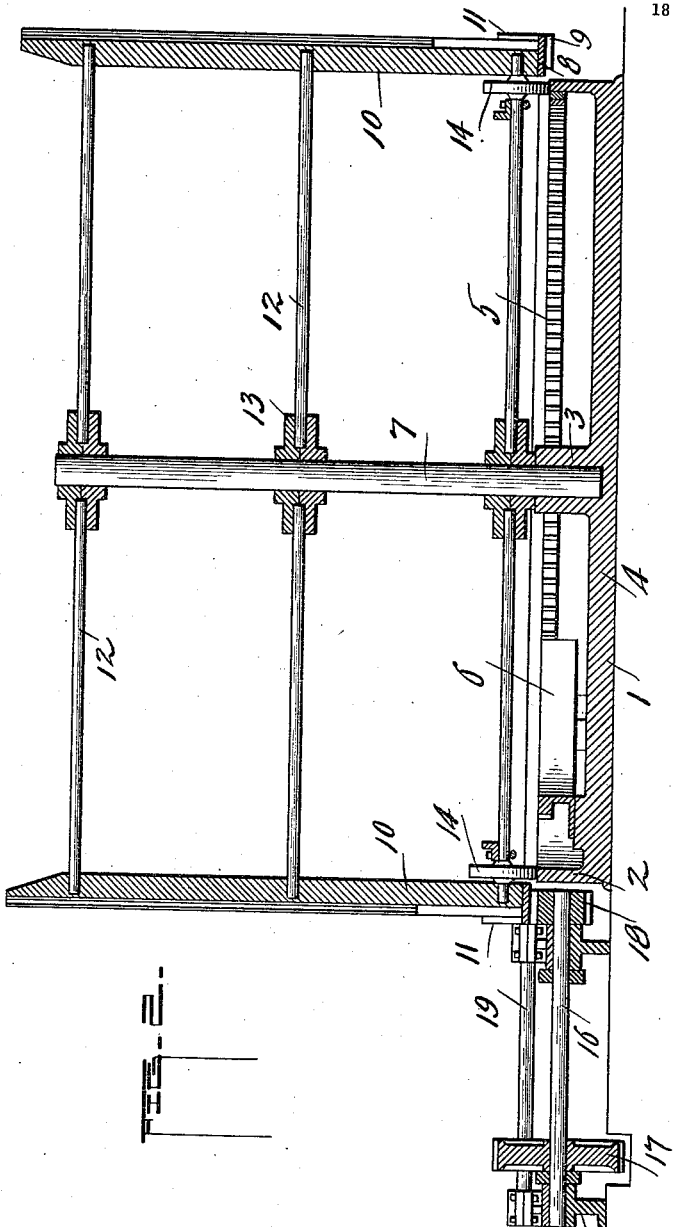

J., P., P. W. & J. W. SOMMER.
B. L. SOMMER, EXECUTOR OF J. W. SOMMER, DEC'D.
FENCE FABRIC MACHINE.
APPLICATION FILED JULY 5, 1902.
1,004,704.
Patented Oct. 3, 1911.
18 SHEETS—SHEET 3.
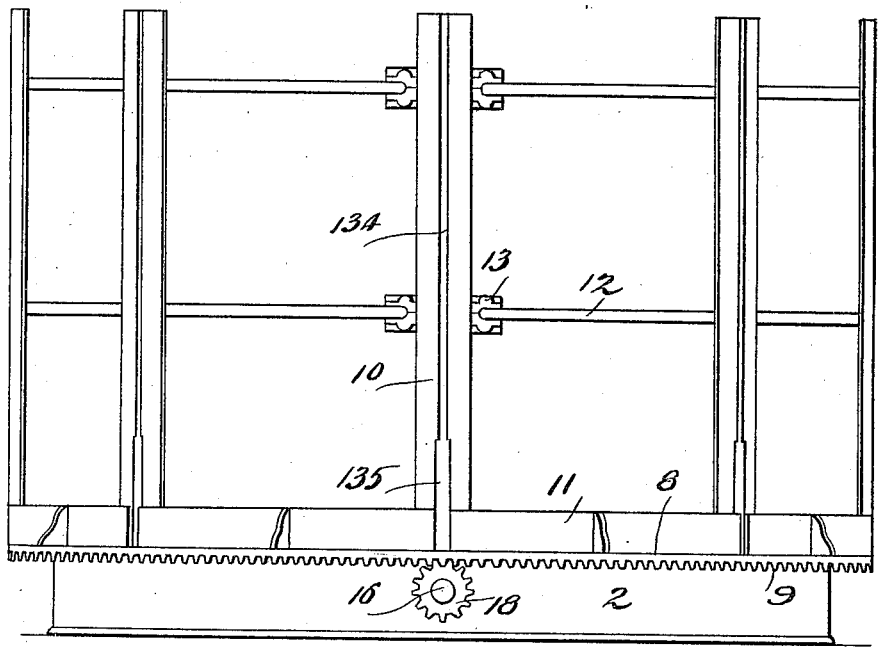
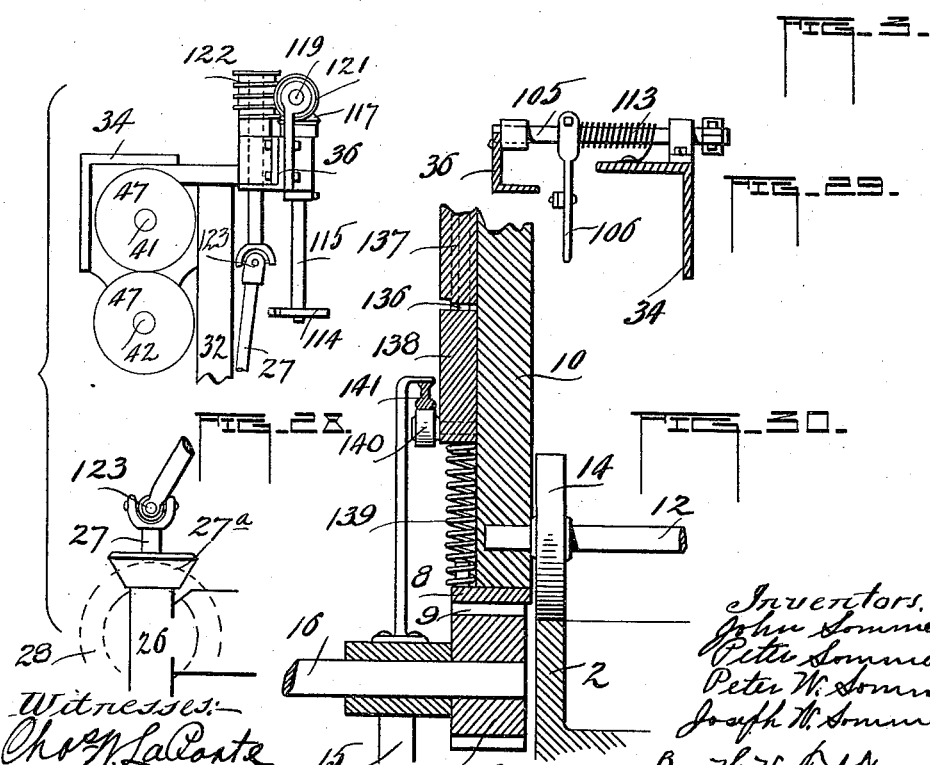

J., P., P. W. & J. W. SOMMER.
B. L. SOMMER, EXECUTOR OF J. W. SOMMER, DEC'D.
FENCE FABRIC MACHINE.
APPLICATION FILED JULY 5, 1902.
1,004,704.
Patented Oct. 3, 1911.
18 SHEETS—SHEET 4.
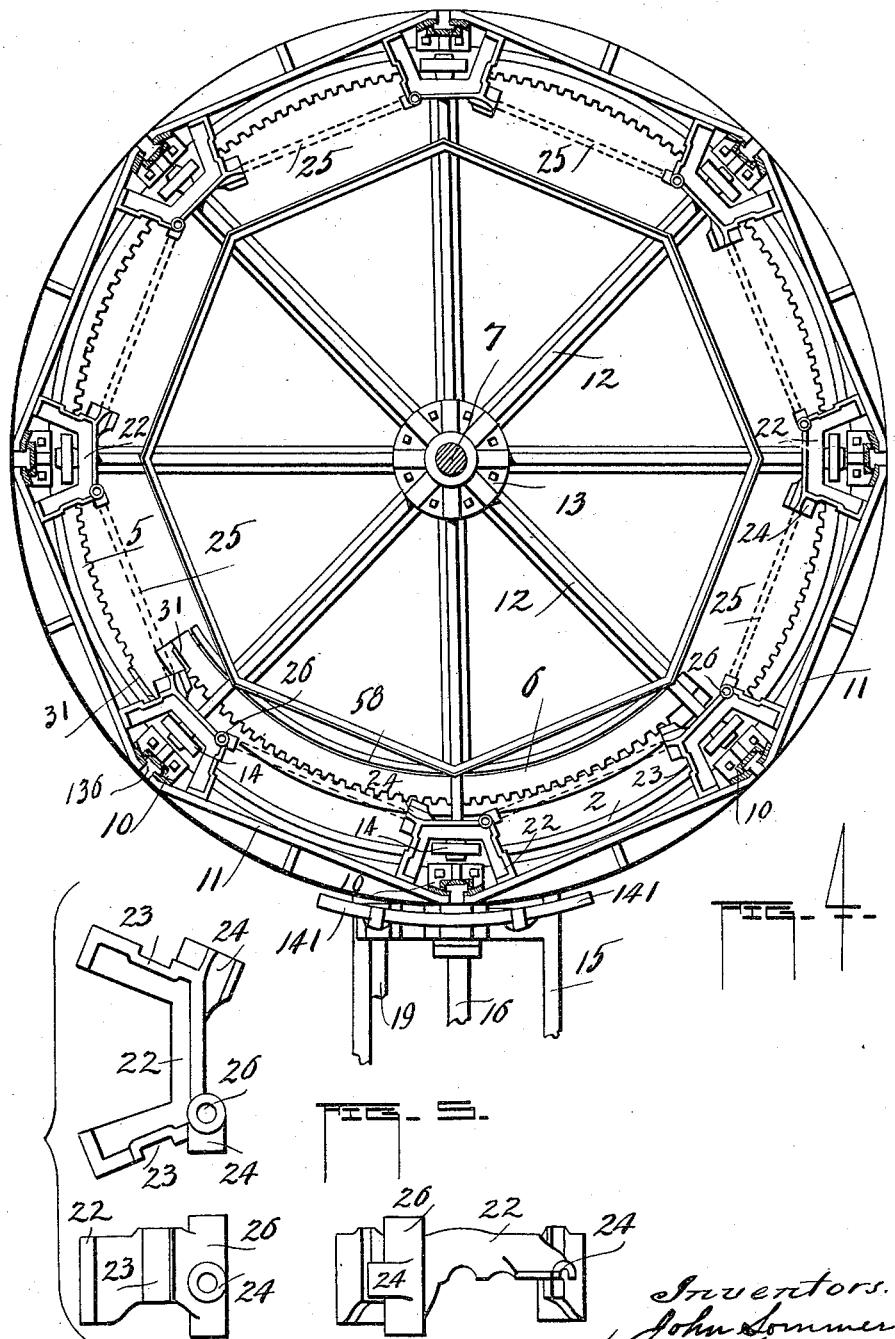

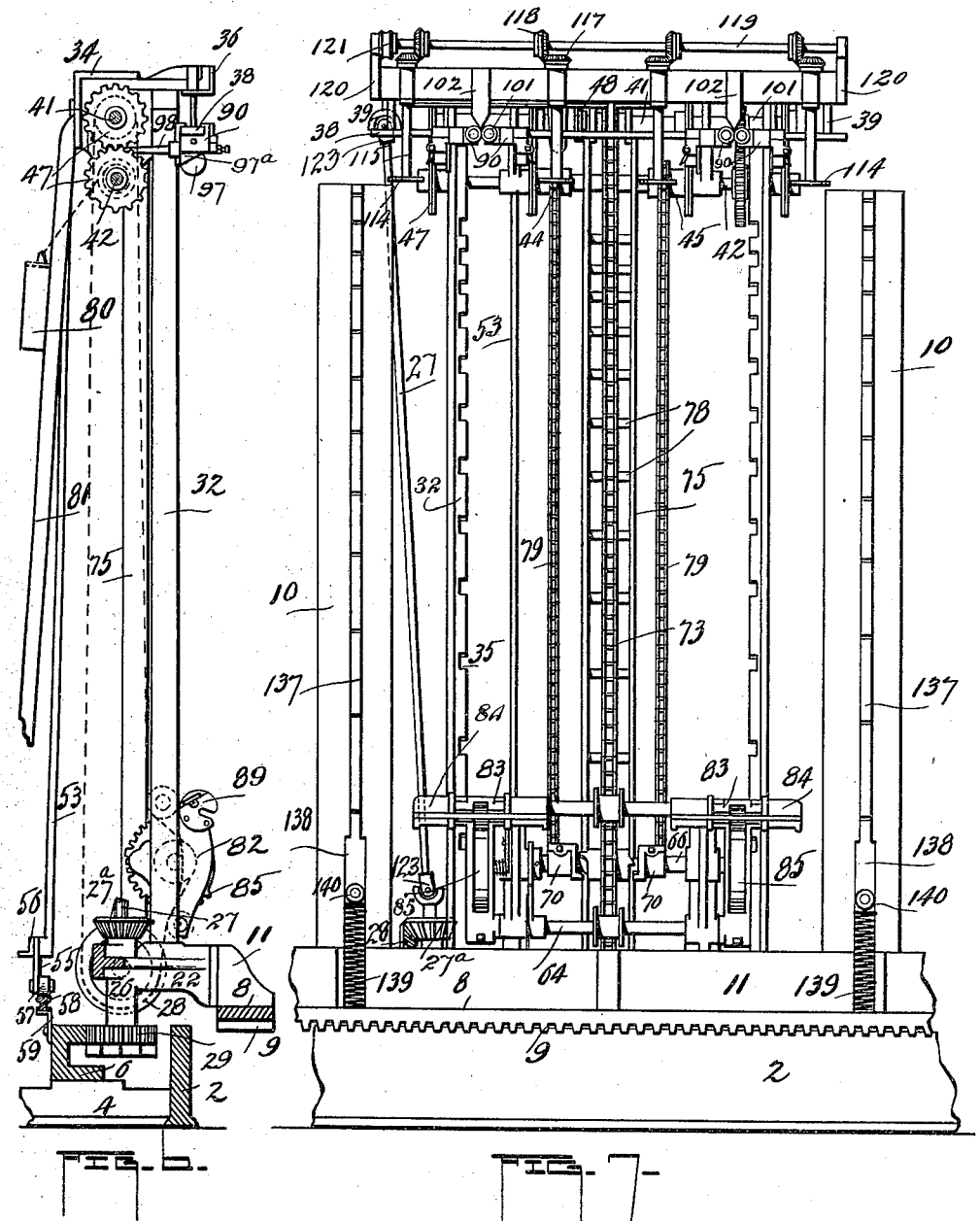

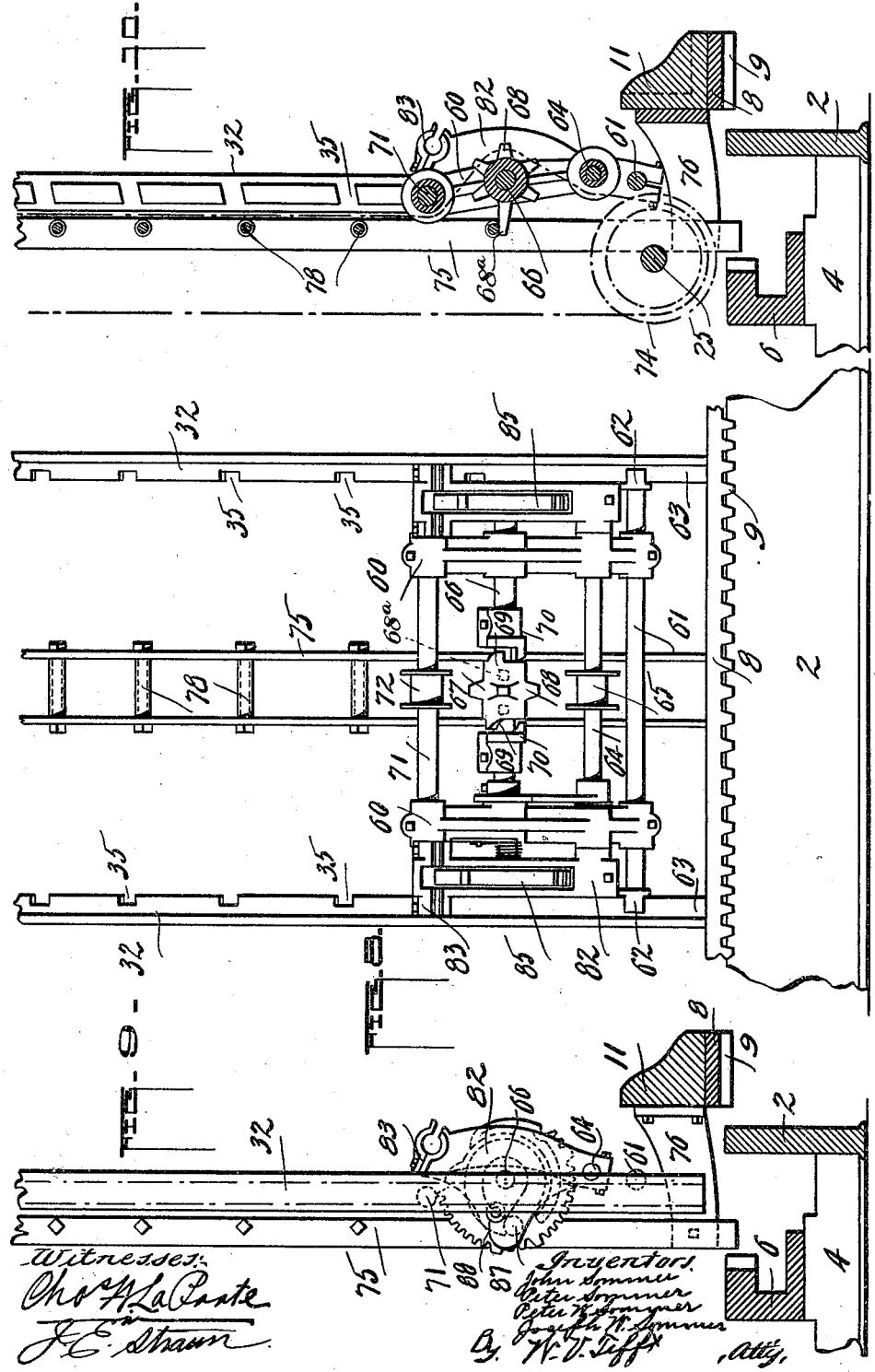

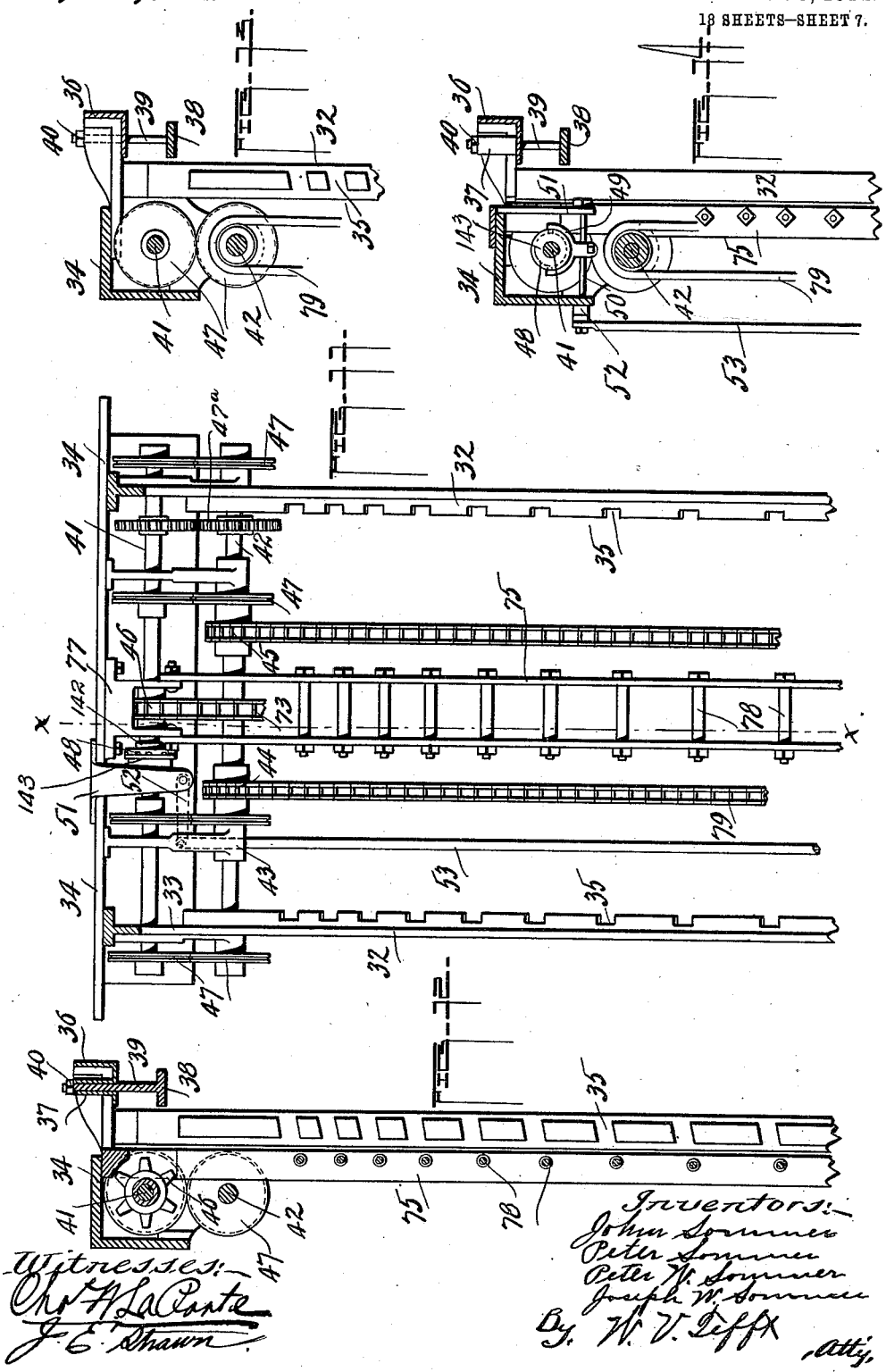

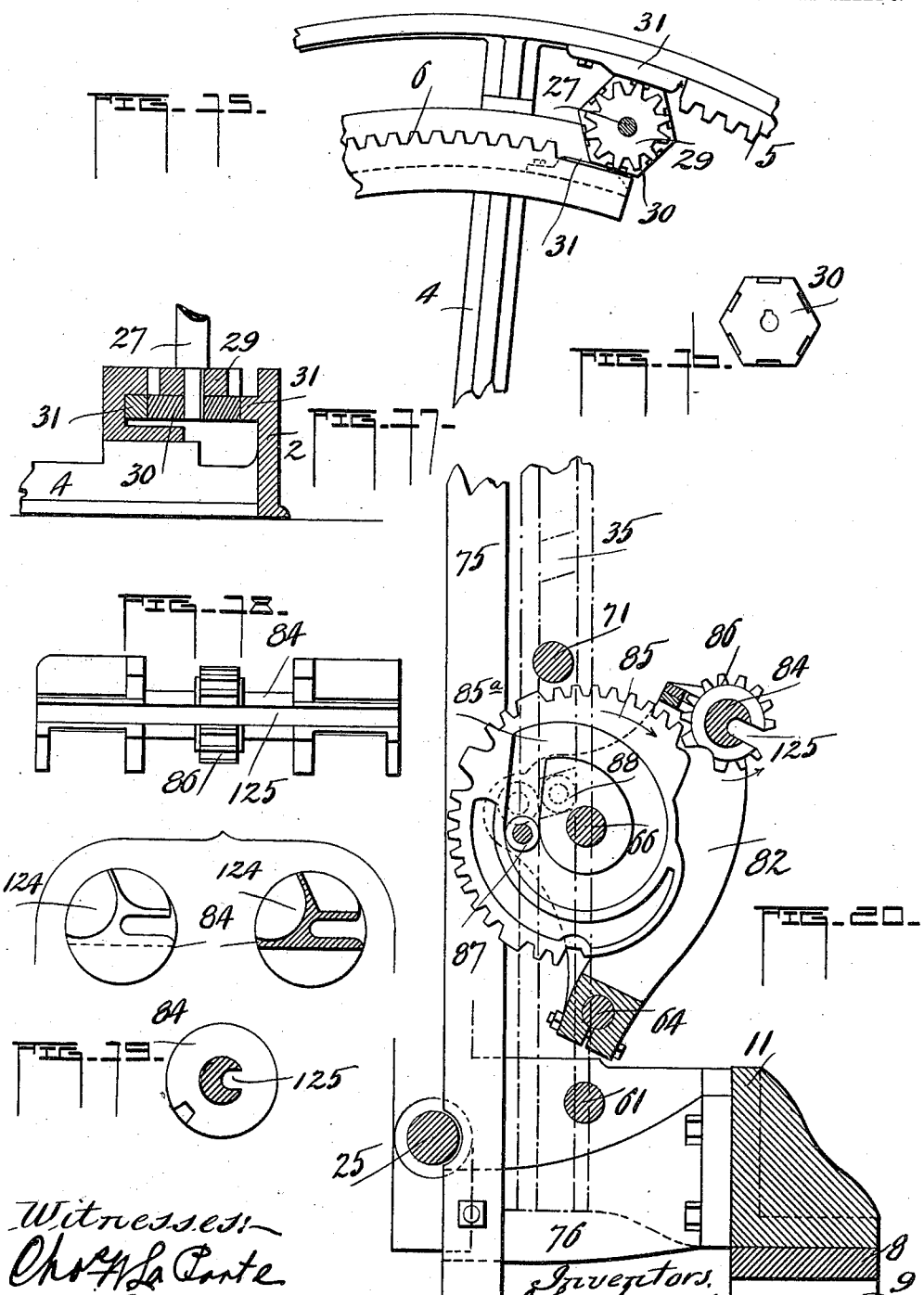

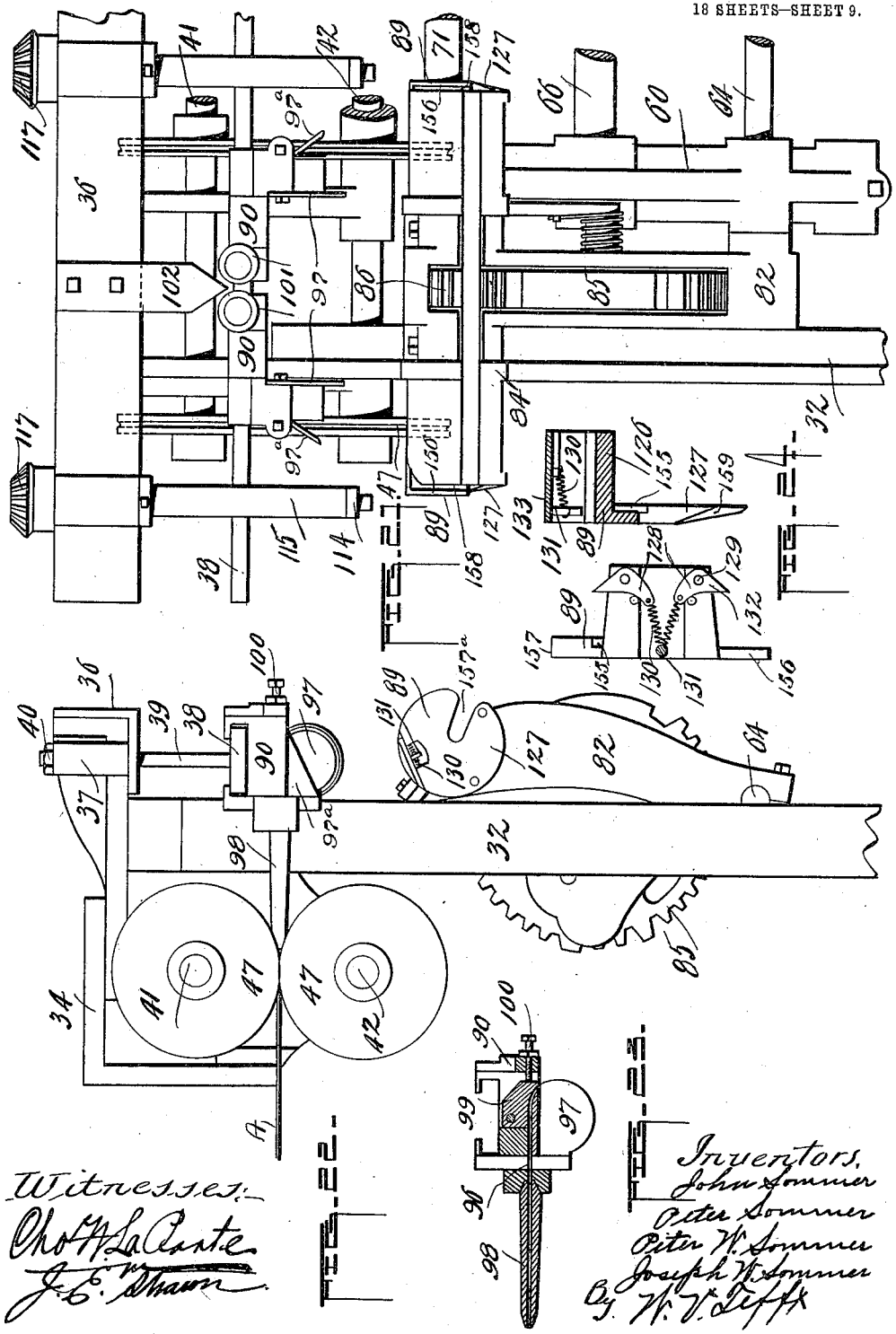

J., P., P. W. & J. W. SOMMER.
B. L. SOMMER, EXECUTOR OF J. W. SOMMER, DEC'D.
FENCE FABRIC MACHINE.
APPLICATION FILED JULY 5, 1902.

1,004,704.

Patented Oct. 3, 1911.
18 SHEETS—SHEET 10.

Witnesses:—

Inventors.
John Sommer
Peter Sommer
Peter W. Sommer
Joseph W. Sommer
By W. V. Tefft, Atty.

COLUMBIA PLANOGRAPH CO., WASHINGTON, D. C.

J., P., P. W. & J. W. SOMMER.
B. L. SOMMER, EXECUTOR OF J. W. SOMMER, DEC'D.
FENCE FABRIC MACHINE.
APPLICATION FILED JULY 5, 1902.
1,004,704.
Patented Oct. 3, 1911.
18 SHEETS—SHEET 11.
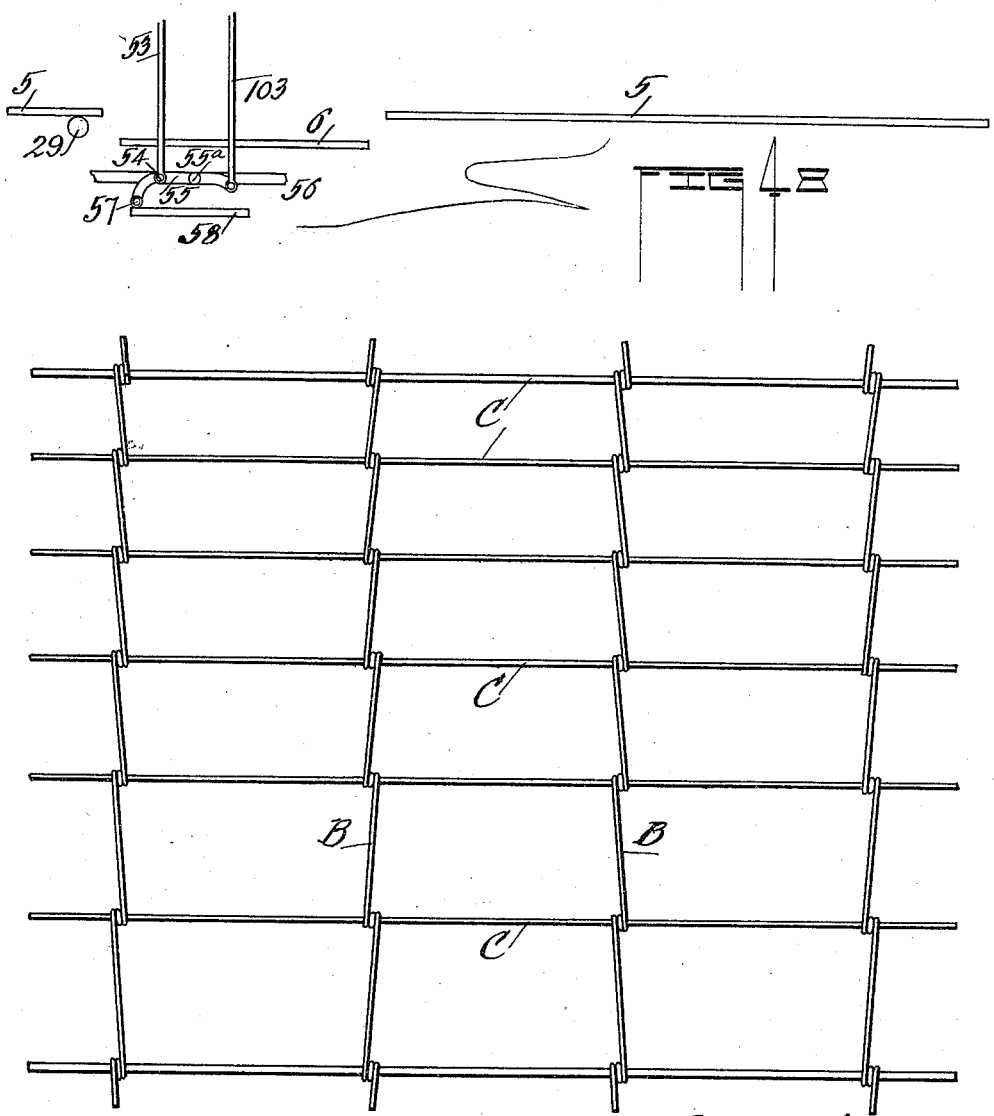
Witnesses:
Chas H Bailey
Robert Plows
Inventors
John Sommer
Peter Sommer
Peter W. Sommer
Joseph W. Sommer
By Chas H La Prateatty
for the assignee

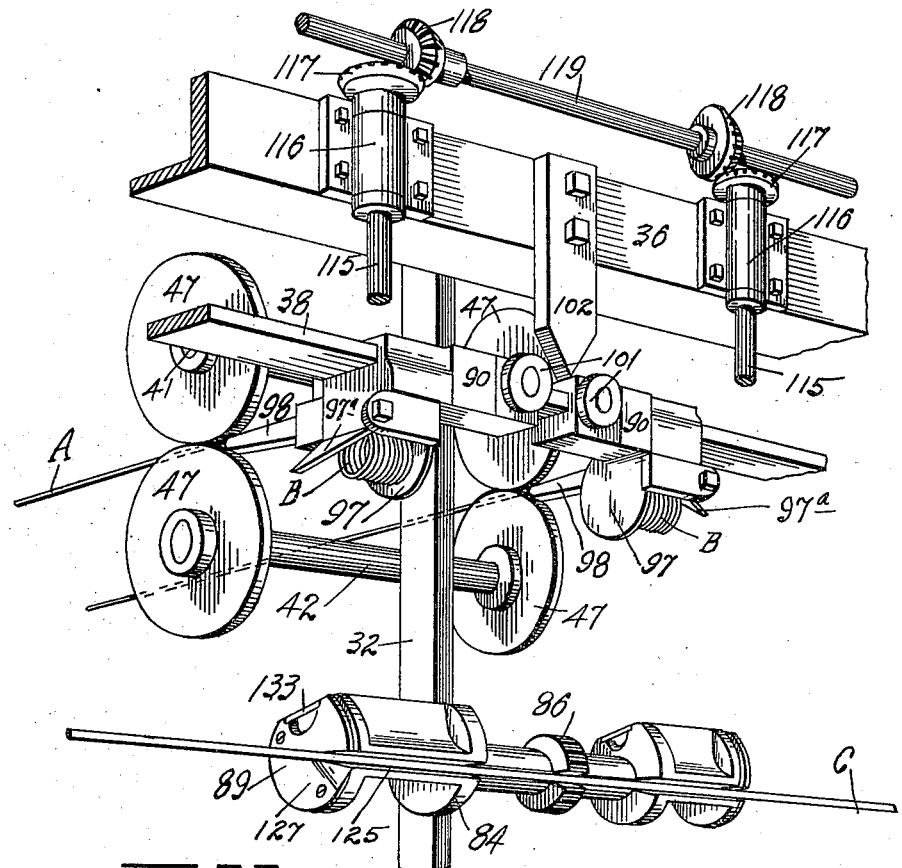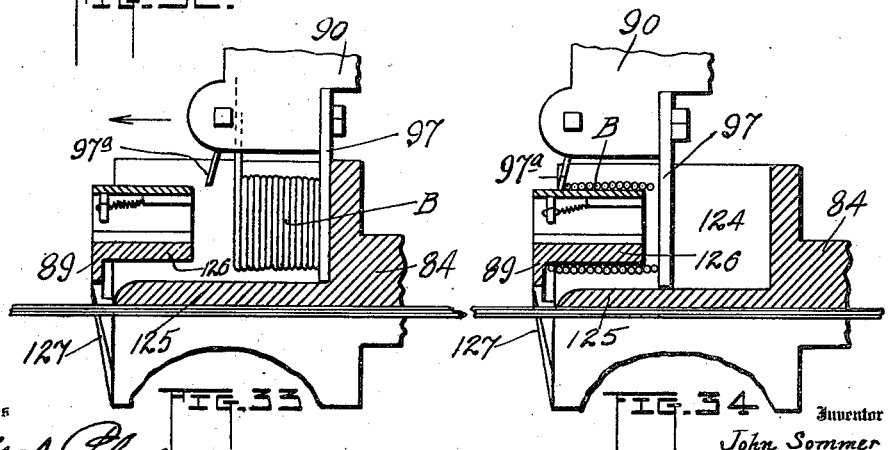

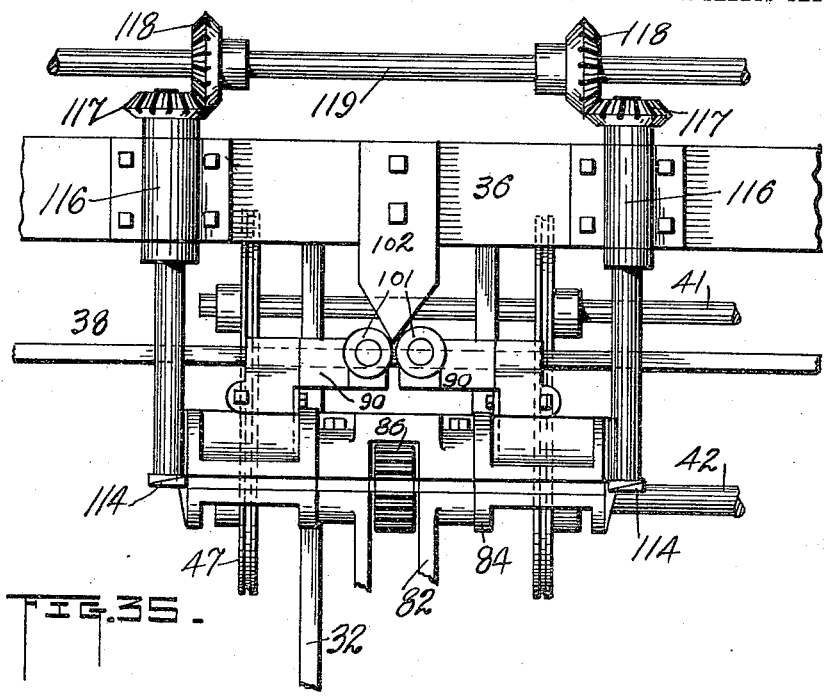
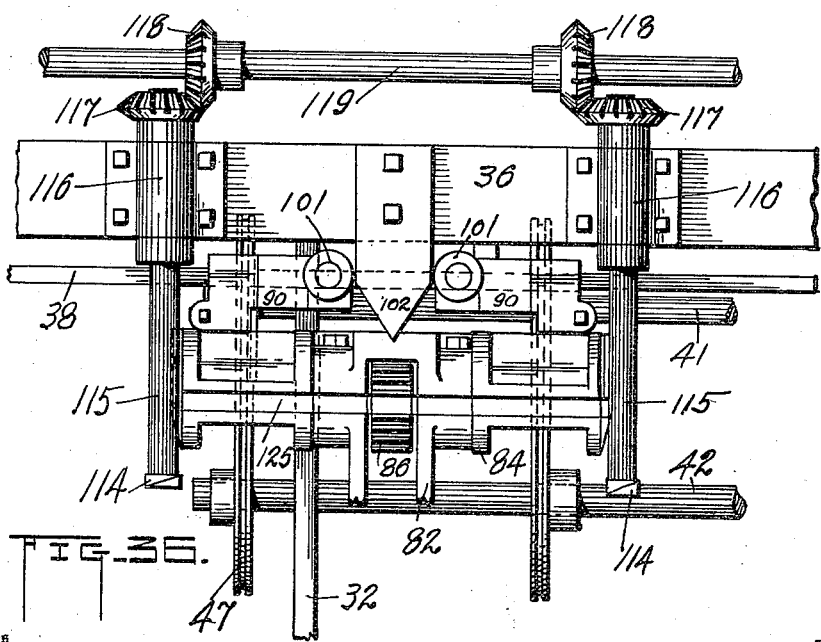

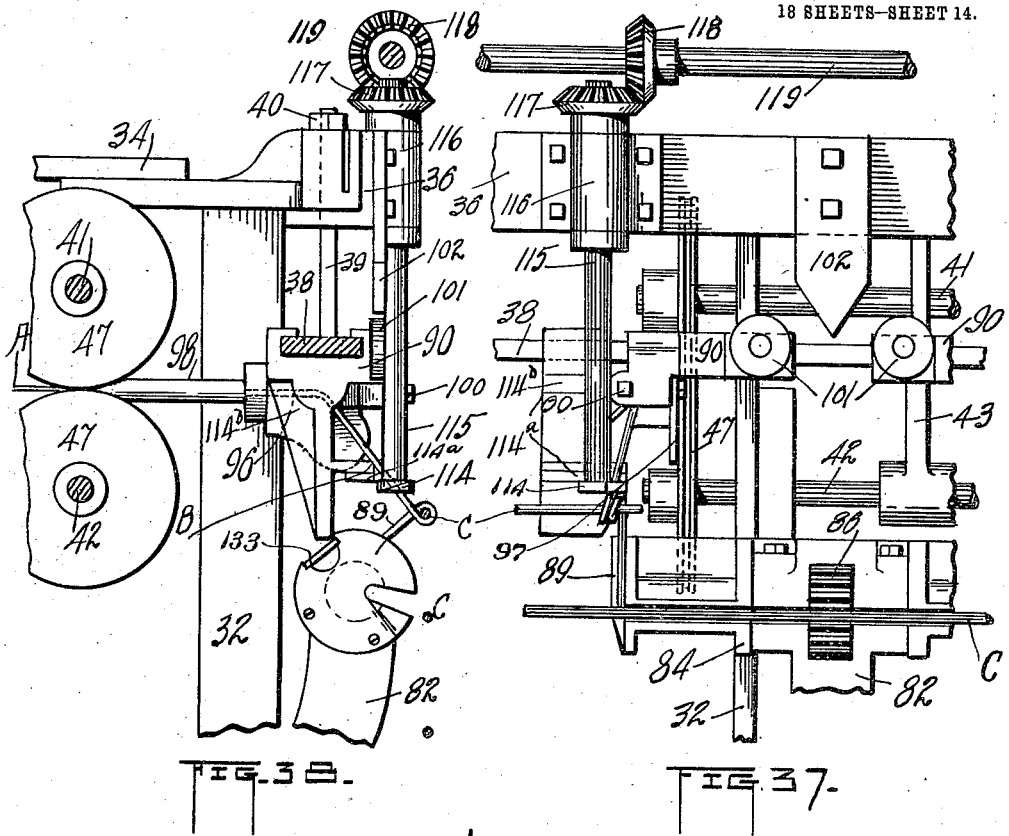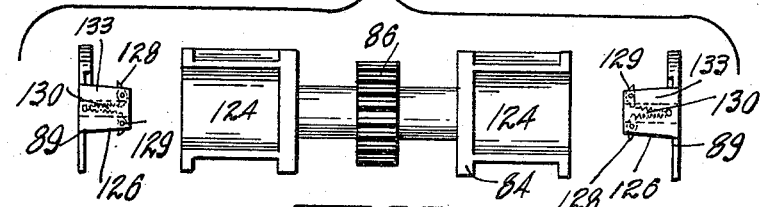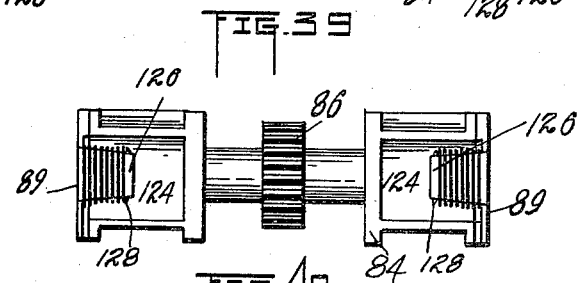

J., P., P. W. & J. W. SOMMER.
B. L. SOMMER, EXECUTOR OF J. W. SOMMER, DEC'D.
FENCE FABRIC MACHINE.
APPLICATION FILED JULY 5, 1902.
1,004,704.
Patented Oct. 3, 1911.
18 SHEETS—SHEET 15.
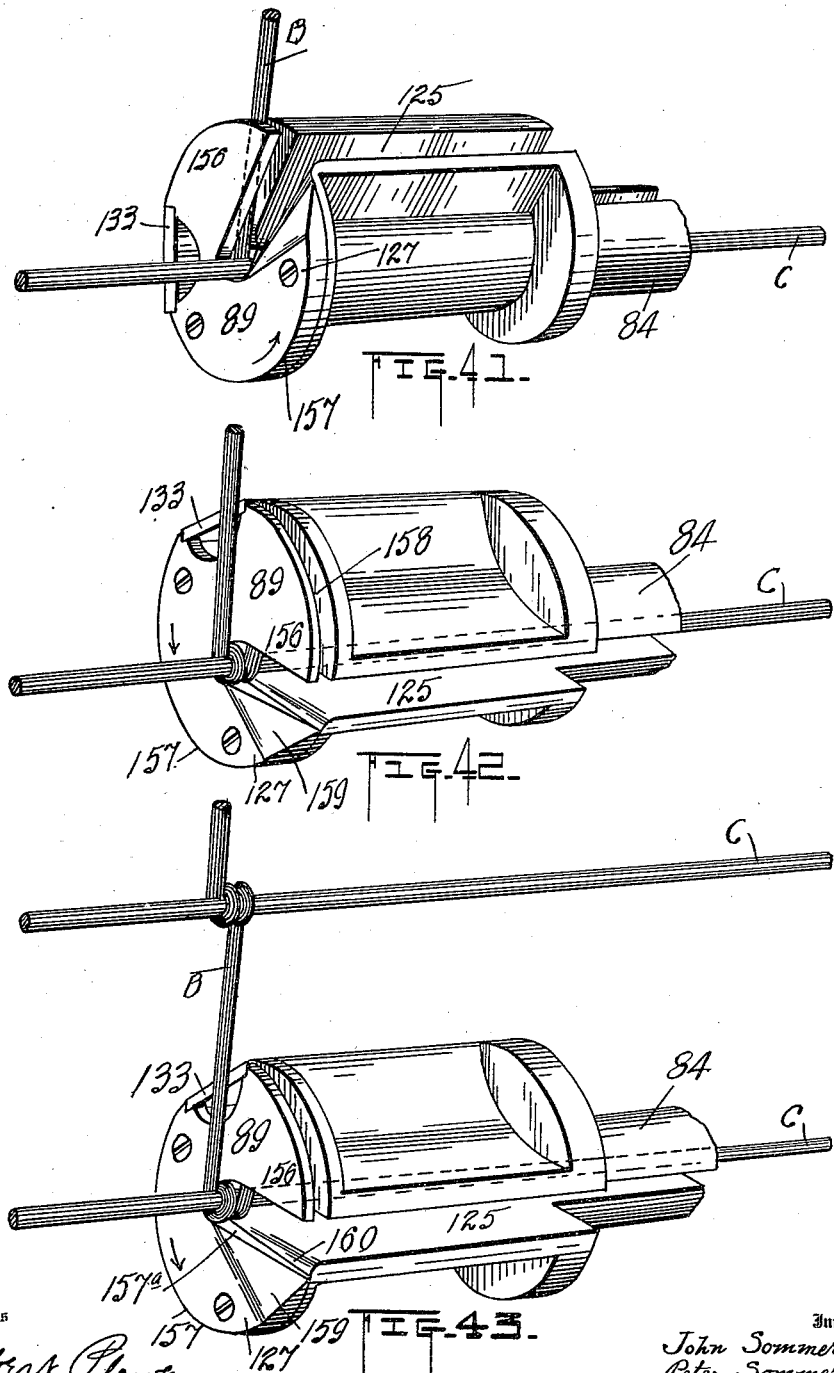

J., P., P. W. & J. W. SOMMER.
B. L. SOMMER, EXECUTOR OF J. W. SOMMER, DEC'D.
FENCE FABRIC MACHINE.
APPLICATION FILED JULY 5, 1902.
1,004,704.
Patented Oct. 3, 1911.
18 SHEETS—SHEET 16.
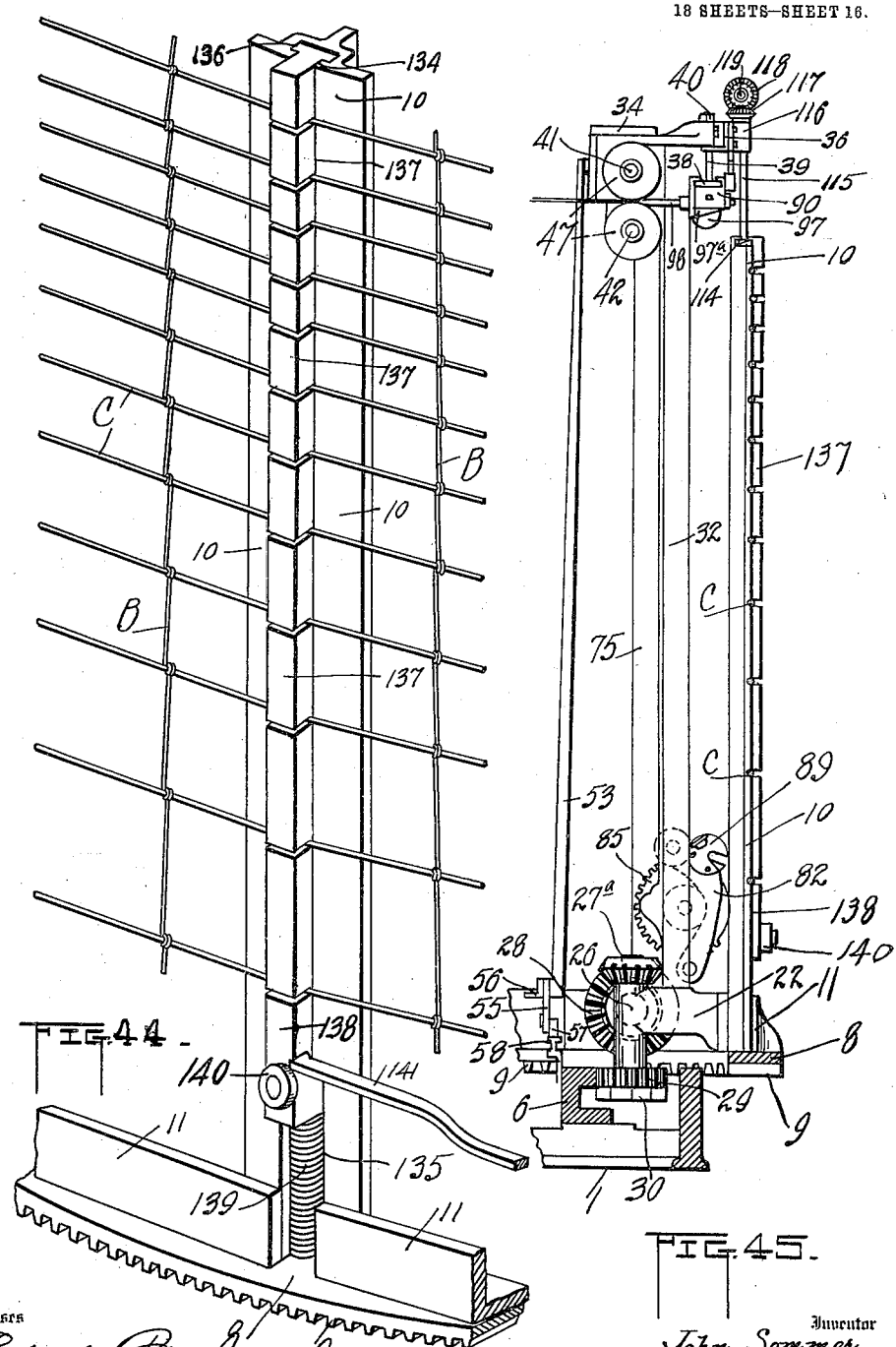

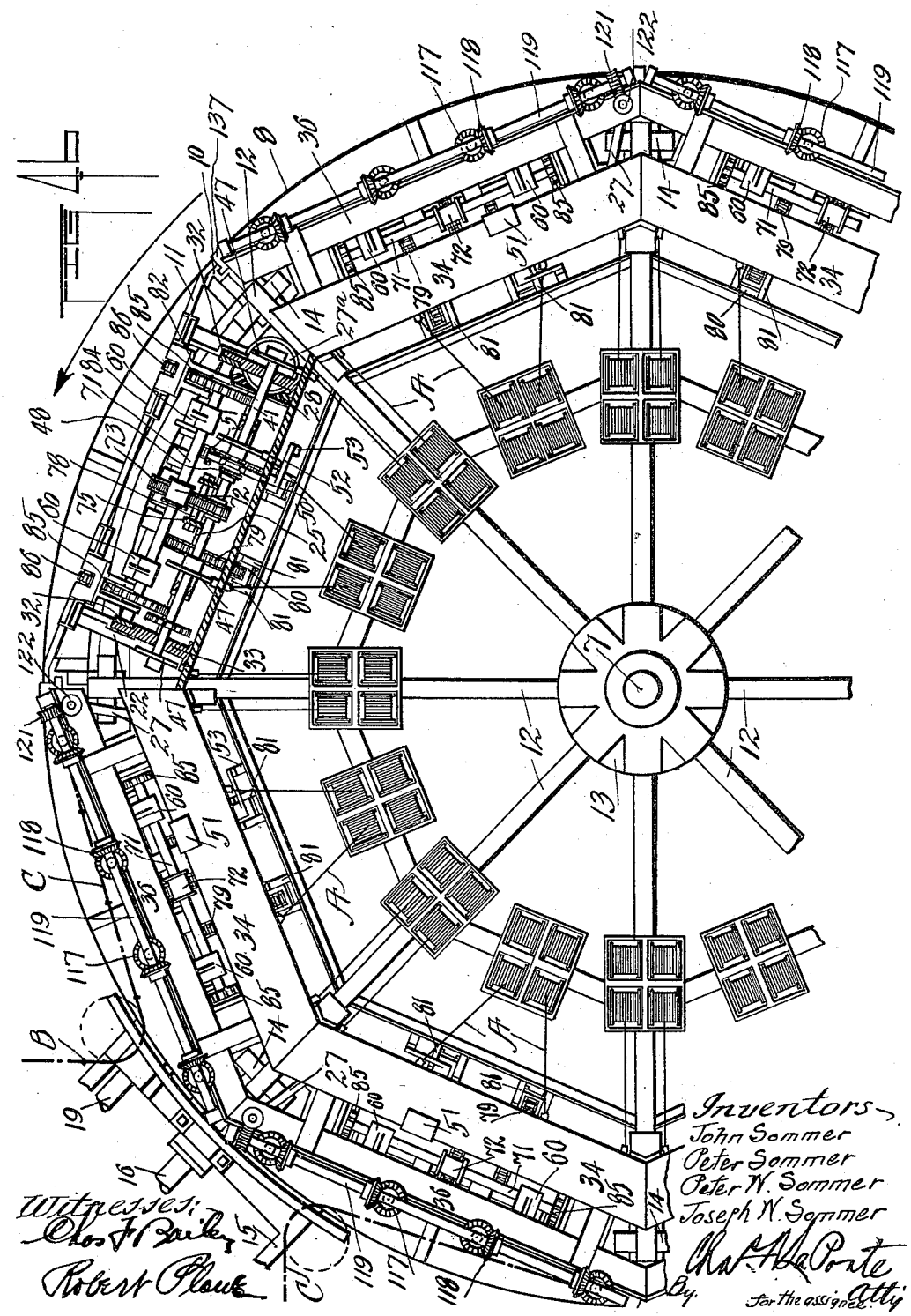

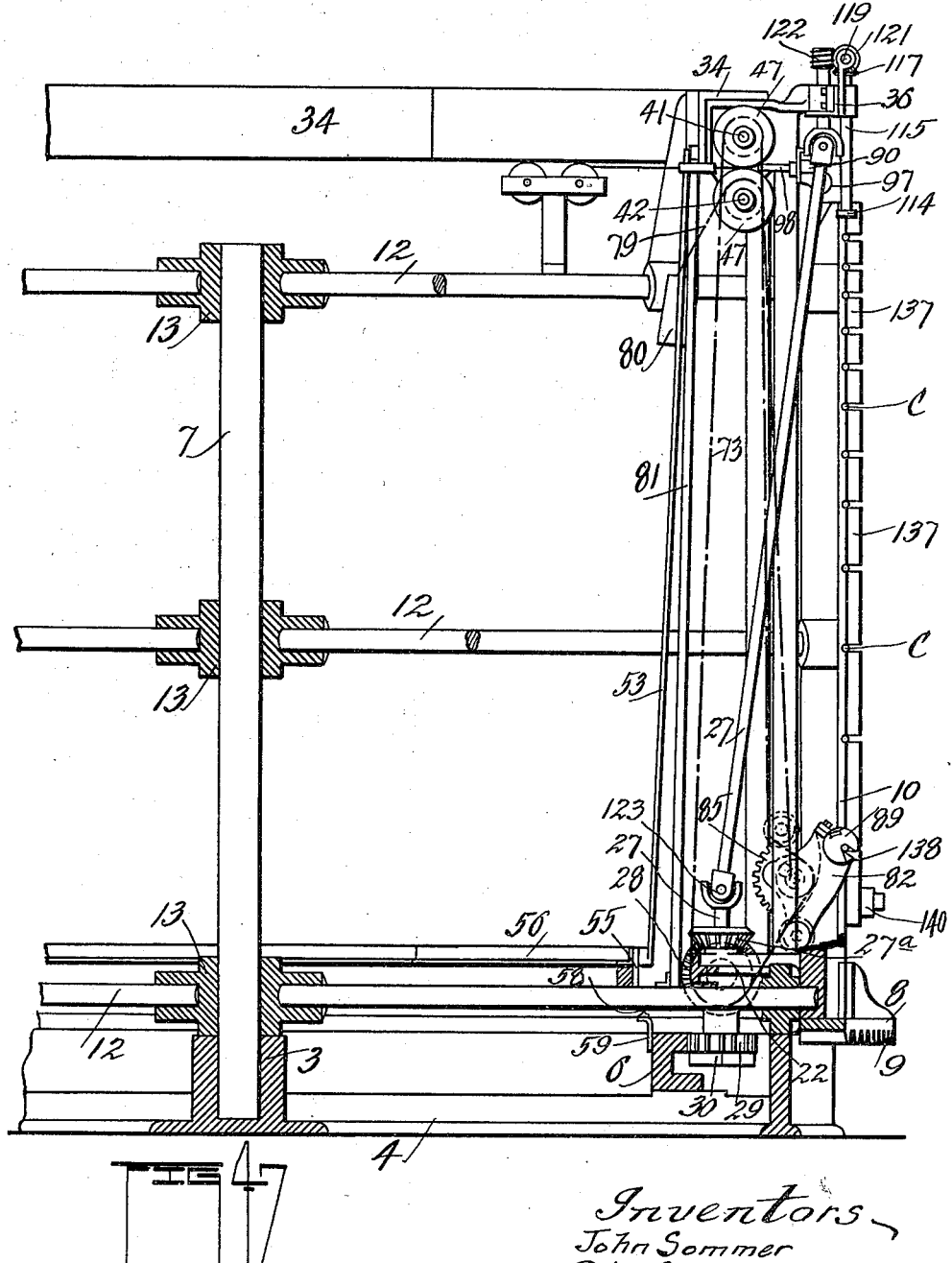

UNITED STATES PATENT OFFICE.

PETER SOMMER, OF PEORIA, ILLINOIS, JOHN SOMMER, OF POINT LOOKOUT, UTAH, AND PETER W. SOMMER AND JOSEPH W. SOMMER, OF PEORIA, ILLINOIS; BENJAMIN L. SOMMER EXECUTOR OF SAID JOSEPH W. SOMMER, DECEASED.

FENCE-FABRIC MACHINE.

1,004,704.  Specification of Letters Patent.  Patented Oct. 3, 1911.

Application filed July 5, 1902. Serial No. 114,524.

*To all whom it may concern:*

Be it known that we, PETER SOMMER, residing at Peoria, in the county of Peoria and State of Illinois, JOHN SOMMER, residing at Point Lookout, in the county of Boxelder and State of Utah, and PETER W. SOMMER and JOSEPH W. SOMMER, residing at Peoria, in the county of Peoria and State of Illinois, citizens of the United States, have invented certain new and useful Improvements in Fence-Fabric Machines; and we do hereby declare that the following is a full, clear, and exact description of the invention, which will enable others skilled in the art to which it appertains to make and use the same.

This invention has reference to fence-fabric machines, the principle involved consisting in making wire-fence fabrics on a machine comprising a rotating or traveling frame or drum suitably supported or journaled on a stationary base to permit of such movement or rotation of the frame, said frame or drum supporting or having associated therewith a plurality of carriages or shuttles, and means for reciprocating said carriages or shuttles during the movement of the frame or drum.

One of the objects of the present invention, is to facilitate the making or weaving of wire-fence-fabrics, such as heavy and light netting, on a machine that operates to advance the warp, longitudinal or strand wires continuously through the machine. In other words, the construction of the machine is such and the several elements so arranged that they will operate to automatically and continuously advance the warp, longitudinal or strand-wires and apply the woof, cross or stay-wires without any intermission or stoppage in the advance of the warp, longitudinal or strand-wires.

A further object of the invention is to enable the mechanism for feeding the warp, longitudinal or strand-wires forward and the mechanism for feeding the woof, cross or stay-wires forward, to both operate continuously.

The invention has for a further object to build a machine for making preferably a square-mesh fencing, that will carry on the several operations while the warp, longitudinal or strand-wires are being continuously advanced or drawn through the machine, instead of alternately stopping and starting as is the case with most wire-fabric-machines.

For a further and full description of the invention herein and the merits thereof and also to acquire a knowledge of the details of construction of the means for effecting the result, reference is had to the following description and drawings hereto attached.

While the essential and characteristic features of the invention are susceptible of modification, still the preferred embodiment of the invention is illustrated in the accompanying drawings, in which:—

Figure 26:
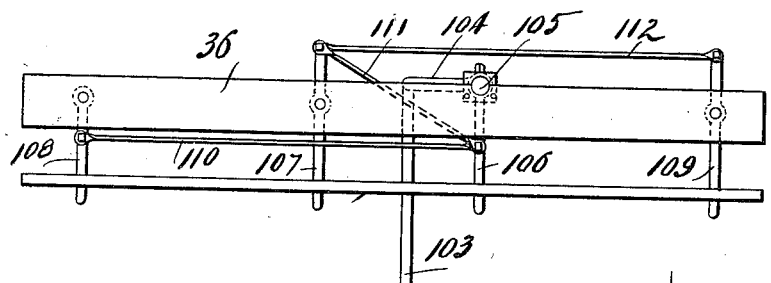
Figure 27:
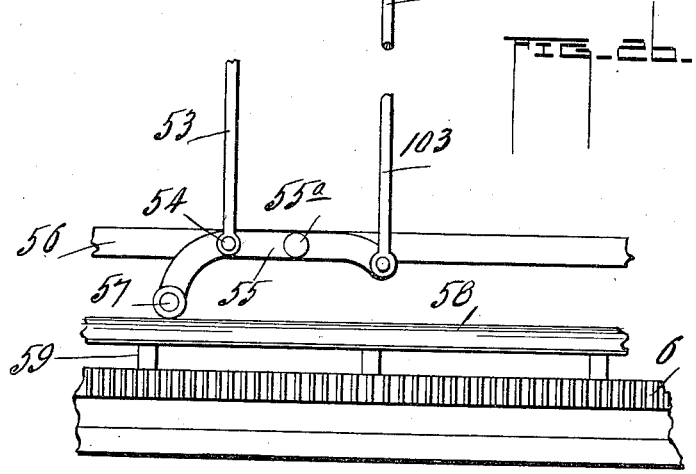

Figure 1 is a plan view showing the base of the machine and associated parts; Fig. 2 is a vertical section showing the base and associated parts, and the supports of the movable frame or drum; Fig. 3 is an elevation of the base and supports of the movable frame or drum, omitting the fence-fabric weaving mechanism; Fig. 4 is a plan view in section of certain parts, including the base and supports of the frame or drum; Fig. 5 illustrates by several different views certain castings or brackets; Fig. 6 is a view in elevation, partly in section, showing the base, frame, or drum, carriage or shuttles, coil mechanism and other parts; Fig. 7 is a front view of Fig. 6 and also showing parts not seen in Fig. 6; Fig. 8 is a view, somewhat enlarged, showing carriage or shuttle parts and support; Fig. 9 is an elevation of Fig. 8; Fig. 10 is an enlarged cross-section through Fig. 8; Fig. 11 is a view, somewhat enlarged, showing certain mechanism carried at the upper ends of the carriage bed; Fig. 12 is a section on the line $x$—$x$ of Fig. 11; Figs. 13 and 14 are elevations in section, showing details of parts illustrated in Fig. 11; Fig. 15 is an enlarged detail in plan, showing certain parts of the bed; Fig. 16 is a detail in plan of a device, of which there is a series movable with the rotating frame arranged for locking parts of the rotating frame just previous to the carriage ascending or crossing the frame and immediately upon the carriage reaching its lower-most point in the frame; Fig. 17 is a cross-section through parts of Fig. 15; Fig. 18 is an enlarged elevation of the twister section or needle; Fig. 19 illustrates in end elevation and cross-section the twister section or needle; Fig. 20 is an enlarged cross-section of parts of the carriage or shuttle; Fig. 21 illustrates in elevation parts of the carriage or shuttle and coiling devices or bobbin formers; Fig. 22 is an elevation of these parts; Fig. 23 is a coiling device or bobbin-wire former; Fig. 24 is the coil or bobbin retainer carried by the twister section or needle; Fig. 25 is an elevation of devices carried at one end of each of the supports in which the carriage or shuttle is reciprocated, which said devices are cutters for severing the wires after the coil or bobbin has been made and the same deposited in the twister section or needle of the carriage or shuttle; Fig. 26 is an elevation of parts for shifting the coiling or bobbin forming devices to cause them to engage the twister sections or needles; Fig. 27 is an elevation of parts in the base of the rotating frame for actuating certain clutch parts and to simultaneously actuate the device shown in Fig. 26; Fig. 28 is a sectional elevation showing details of parts at the head and at the base of the rotating frame for actuating devices which in turn actuate the severing means shown in Fig. 25; Fig. 29 is a transverse section and elevation of the shifting device shown in Fig. 26; Fig. 30 is an enlarged vertical section of parts of the bed and rotating frame and clamping device; Fig. 31 is a view showing the style of fabric produced by our machine and illustrating the same just as received from the machine; Fig. 32 is a perspective view of a part of the mechanism at one end of each of the carriage or shuttle beds, showing particularly the stay-wire feed, the coil or bobbin formers and one of the twisters or needles; Fig. 33 is an enlarged sectional detail showing a portion of one of the twisters or needles, the bobbin spool or coil retained thereon, and a coil in the act of being placed in the twister; Fig. 34 is a view similar to Fig. 33, except that the coil or bobbin forming device has been shifted to place the bobbin or coil on the spool; Fig. 35 is a view similar to Fig 21, except that the twister or needle has been moved to the position in which the needle or twister is shown in Fig. 33, where the bobbin has just been placed in the needle preparatory to being placed on the spool; Fig. 36 is a view similar to Fig. 35, except that the bobbin formers or coil retainers have been shifted to place the bobbins or coils on the spools, the same as in Fig. 34; Fig. 37 is an elevation showing parts similar to that shown in Figs. 35 and 36, except that the carriage or shuttle supporting or carrying the twister or needle has receded from the bobbin former or started on its journey across the bed of the machine carrying with it the formed bobbin, and just previous to the severance of the stay-section; Fig. 38 is an elevation partly in section of parts seen in Fig. 37; Fig. 39 shows a plan of one of the twisters or needles and the bobbin or coil receiving seats in said needles, also the spools which are intended to hold the bobbins in the needles, the spools being detached from the needles; Fig 40 is a view somewhat similar to Fig. 39, except that the spools are attached to the needles and the bobbins or coils are shown in operative position on said spools; Figs. 41, 42, and 43 are perspective views in detail of a portion of one of the twisters or needles showing the manner in which the same are operated to wrap or coil the stay-section or bobbin-wire about the longitudinal wires of the fence; Fig. 44 is an enlarged detail in perspective of a portion of the bed of the machine showing the clamping blocks between which the warp, longitudinal or strand wires are held in their passage through the machine; Fig. 45 is an elevation of parts similar to what is shown in Fig. 6, except that the clamping blocks are in place, clamping upon the warp longitudinal or strand wires of the fence. Fig. 46 is a top plan view showing four complete wire attaching units or stay-wire coiling mechanisms, and a part of the fifth; the top frame above one of said units being removed to show the relation of the several parts in place, and further illustrating the wire attaching means attaching the stays to the lowermost strands or longitudinal wires, the arrow on the figure designating the direction of travel of the strand wires; Fig. 47 is a view partly in side elevation and partly in section, showing one of the complete units or wire connecting mechanisms and associated parts, the relation of the parts being substantially the position of the parts seen in plan in Fig. 46, where the top of the frame has been removed; Fig. 48 is a diagram of parts of the frame and certain associated parts of one of the units, and illustrates the manner in which a reverse operation is alternately imparted to certain clutch parts for feeding and withdrawing the stay-wire.

Like characters of reference indicate corresponding parts throughout the figures.

In the drawings, 1 refers to a base-plate or frame-support arranged with an outer annular flange or ring 2, and 3 is a tubular bearing centrally arranged in said base, and 4 are spider arms connecting the tubular support 3 with the outer ring 2.

5 is an internal ring-gear secured to the inner concave face of the flange or ring, and extends part way around the circumference of the inner face thereof, and 6 is a segmental cog-rack having a convex presented surface supported in the manner shown by several of the spider arms 4, and in such a manner that the cog-face is removed a short distance from the inner face of the flange 2 and opposite the space left vacant where the internal ring-gear 5 does not cover the surface of the inner face of the ring 2 of the base. This arrangement is for a purpose to be hereinafter more fully described.

7 is a vertically carried shaft having its lower end journaled in the bearing 3 of the base 1.

8 refers to an annular ring, the lower face of which is provided with a ring-gear 9. This ring-gear is slightly larger in diameter than the flange 2 of the base 1 and is arranged to be carried approximately parallel with the upper surface of the ring, and 10 are vertical supports of which a series is provided extending up from the upper face of the annular ring 8 and connected therewith, and 11 are cross plates which connect the lower portions of the supports 10 in the manner shown.

12 are spindles or rods fixedly secured at their outer ends in the supports, and their inner ends secured in common boxings or bearings 13 supported by the vertical shaft 7. On the lower series of spindles or rods 12 are provided small wheels or rollers 14, carried adjacent to the supports 10 and arranged to travel on the upper edge of the flange or annular ring 2 of the base 1. At this point, the mechanism for rotating the revolving frame which comprises the ring 8, and the supports 10 connected with the shaft 7 which is journaled in the bearing 3, will now be described.

15 is an auxiliary frame support in which is journaled a shaft 16 carrying the gear 17 and on its inner end the pinion 18 which has a meshing relation with the ring gear 9, supported on the lower face of the annular ring 8. 19 is a shaft also journaled in the auxiliary frame support 15, and 20 is a pinion carried by said shaft and intermeshing with the gear 17, and on this shaft 19 is arranged to be carried a suitable driving pulley 21 for imparting movement to the shaft 16 through the gears 17 and 20, for imparting rotation to the rotary frame support, hereinbefore described, through the pinion 18 intermeshing with the ring gear 9 of the annular ring 8.

22 are castings or brackets which are supported by the annular ring 8 from the frames 11 and have substantially a yoke appearance, see Fig. 5, so as to span the wheels 14 carried by the spindles 12, and also the positely arranged castings or brackets 22. have the grooves 23 upon the opposite sides for supporting frame parts hereinafter described, and also bearings 24. These castings or brackets are arranged in a series on the ratating frame, substantially in number as the supports 10, and the bearings 24 of each casting or bracket are arranged at angles facing similar bearings 24 in opposite castings or brackets; and 25 are short spindles or shafts, having opposite ends journaled in opposite bearings 24 of the oppositely arranged castings or brackets 22. The function of the shaft 25, as will be hereinafter more fully described, is for the purpose of receiving momentum from the segmental ring gears in the bed through suitable mechanism for imparting movement to devices on carriages or shuttles arranged to move coincidingly with the advance of the strand-wires and be reciprocated up and down or across frame supports which are secured in the grooved portions of the castings or brackets 22. Referring again to the castings or brackets 22, 26 refers to a vertical bearing forming a part of one of the bearings 24 in which is journaled the lower end of a shaft 27 carrying a beveled pinion 27ª intermeshing with a bevel gear 28 carried by the shafts 25, and on its lower end is arranged a spur-gear 29 which is arranged to alternately intermesh with the internal ring-gear 5 and the oppositely arranged segmental rack 6 in the bed 1, and preferably integral with the pinion 29 is a member 30 of polygon shape. The function of a device of this shape rotating with the frame, is such that, as the frame rotates on its bed and the carriages or shuttles reciprocate on their supports, it will reach the lowermost point in the bed simultaneously as the pinion 29 reaches one end of the segmental internal ring-gear 5, and at this point are provided bearing plates 31 secured to the inner surface of the flange 2 and to the outer surface of the segmental ring 6 (see Fig. 1), which are engaged by flat sides of the casting 30 (see Fig. 15) for retaining the carriage or shuttle at its lowermost point until the pinion 29 engages with the cogs of the segmental rack 6 which will impart a reverse movement to the carriage or shuttle, or, in other words, advance it to the top of its support, and simultaneous as it reaches its uppermost point, the pinion 29 will be caused to engage the opposite end of the segmental internal ring gear 5 for advancing the carriage or shuttle to the lowermost point in its bed.

32 are vertical frame supports, see Figs. 6 and 7, securely fastened at their lower ends in the groove portions 23 of the casting 22. These supports form the bed on which the carriage or shuttle, to be hereinafter described, reciprocates. The upper ends of the supports are securely fastened to casting 23, see Fig. 11, forming a part of a housing 34, in which is arranged suitable mechanism to be described. The matching faces of the frame supports 32 are grooved or slotted, in the manner shown at 35, at graduated points throughout the length of the same. By this provision, devices of a carriage or shuttle reciprocally arranged in the bed, formed of these supports 32, may be alternately caused to engage the slots 35, for giving a stopping and starting movement to the carriages or shuttles as they advance in the bed. These slots, arranged at graduated distances as shown, provide for the making of wire fencing on the machine, the strand wires of which will be connected by woof or stay wire sections at graduated distances throughout the mesh of the fence, and the height of the supports with their slotted portions determines the height of the fence to be made, whereby the top strand, selvage-wire or cable of the fence may be at graduated distances throughout the support; this is better understood by saying that the arrangement of the slots 35 in the carriage bed, provides for spacing the strand wires farther and farther apart, as the carriage or shuttle advances in the bed for the purpose of connecting the strand wires by a transverse stay section.

Referring to the housing 34, 36 is a supplemental frame support having a series of tubular bearings 37, see Figs. 12 and 22, and 38 is a rectangular bar supported beneath and from the supplemental frame support 36 by means of the rods 39 which may or may not be integral with the rectangular bar 38. These rods extend up through the tubular bearings 37, and nuts 40 are used for holding the rectangular bar 38 in adjusted positions relative to its support. In the housing 34 is arranged suitable mechanism coöperating with mechanism on the carriage or shuttle (which said carriage or shuttle is hereinafter described) and this mechanism comprises the shafts 41 and 42 journaled in boxings 43 and geared together through gears 47ª; and 44 and 45 are similar sprocket wheels carried on the shaft 42, and 46 is a sprocket wheel loosely carried on the shaft 41. On the outer end of these shafts, and at points a suitable distance therefrom, we have provided grooved wheels 47, the function of which will be later described, and at a suitable point on the shaft 41 is provided a suitable clutch 48, preferably composed of the part 142 which is integral with the sprocket wheel 46, and the part 143 feathered on shaft 41 and adapted to have an intermittent clutch connection with the part 142.

49 is a clutch arm engaging the part 143 of the clutch 48, and said arm is fixedly secured to a spindle 50 having a bearing in the housing 34 and a frame support 51 secured to said housing, and 52 is a short lever secured to the rear end of the rod 50 which protrudes through the housing 34, and to the outer end of this lever 52, is connected an operating arm 53, and this arm extends down in the frame support and is pivotally connected at 54 to a rocking lever 55 fulcrumed at 55ª to a frame 56. This frame 56 conforms substantially to the shape of the series of sections of the machine and is supported on the lower series of spindles 12.

The rocking lever 55 to which the operating arm 53 has a pivotal connection carrries on one end a roller 57 arranged to intermittently engage with the surface of a track 58 supported by a frame 59. The lever 55 has connected with it other devices which are operated simultaneously as the operating arm 53 is actuated and the same will be hereinafter more fully described. The frame 59 is supported by the segmental rack 6, and therefore the track 58 is approximately the length of said segmental rack, and during the rotation of the machine, the roller 57 will engage with the track 58, which will cause suitable movement to be imparted to the clutch 48, for purposes which will be further explained.

Referring to the carriage or shuttle of the machine, the same comprises castings or brackets 60, see Fig. 8, arranged in duplicate, and these castings or brackets are provided with a series of tubular bearings. In the lowermost bearings is arranged a spindle or rod 61 which extends through the castings or brackets 60, and on its opposite ends are arranged suitable members or blocks 62, arranged to travel up and down ways 63, forming a part of the frame supports 32 referred to as the bed on which the carriage or shuttle reciprocates. 64 is a similar spindle to that of 61, but the same is also journaled in tubular bearings of the castings or brackets 60, and protrudes through the same for the purpose of carrying certain operating parts to be further described, and 65 is an idler centrally disposed on the spindle 64. 66 refers to a spindle similar to the spindles 61 and 64 and is also journaled in tubular bearings of the castings or brackets 60, and on this spindle 66, in line with the idler 65 of the spindle 64 is arranged a drum 67 provided with sprocket teeth 68, also lugs 68ª, see Figs. 8 and 10, and said drum has lug extensions 69, see Fig. 8, from opposite sides, forming clutch faces to engage with members 70 carried by the spindle 66, and 71 is a spindle similar to each of the other spindles referred to, which is journaled in tubular bearings of the castings or brackets 60, and 72 is an idler centrally disposed thereon, and 73 refers to a sprocket chain traveling around the sprocket wheel 46 on the shaft 41 at the upper end of the bed, and extending down, travels around the rear of the idler 72, and engaging with the forward face of the drum 67 arranged on the spindle 66, is caused to travel and engage with the rear of the idler 65, and down and around a sprocket 74 carried by the spindle 25, and up and around the sprocket 46 as described. The sprocket chain is actuated through the rotation of the shaft 25 which receives its power from the beveled pinion 27ª which is moved by contact of the pinion 29 with the internal ring gear 5, and the segmental rack 6, by the rotation of the annular ring 8 which receives its momentum through the ring gear 9 and the pinion carried by the power shaft 16. And it is through the medium of the chain 73 that the carriage or shuttle is permitted to traverse the length of its bed from the starting point which is the upper end to the lowermost point therein, and reversed and raised again to the starting point.

75 represents a frame work located in the bed between the supports 32, and at the rear of the carriage or shuttle, the lower end supported from a brace plate 76 secured to the rear face of the plates 11, supported upon the top of the annular ring 8, the upper end of the frame being secured to the casting 77 secured to the housing 34. At graduated points throughout this frame work are spacing devices 78 beginning at a suitable point near the upper end of the frame work and increasing in distance from each other to a suitable point near the lower end thereof.

Referring to the carriage or shuttle comprising the parts herein referred to, a weight is provided for balancing the carriage or shuttle as it reciprocates in its support. This is accomplished by sprocket chains 79, see Fig. 7, suitably fastened to the members 70 on the shaft 66 of the carriage or shuttle, and extending up engage with the sprocket wheels 44 and 45, and have their free ends connected with the weight 80, see Fig 6, which is arranged to travel up and down in a frame work 81, the upper end of which is securely fastened to the housing 34, and braced in any suitable manner at its lower end.

On the outer ends of the shaft 64 of the carriage or shuttle is carried a split casting 82, and in the upper end of the casting 82 is a bearing 83 for retaining a twister section or needle 84, and adapted to be carried by the casting 82 is a wheel 85 having a cam face 85ª, said wheel 85 being journaled on the shaft 66 of the carriage or shuttle. This cam-wheel is provided with a suitable number of teeth for engaging with a segmental pinion 86 carried by the twister section or needle 84 for actuating the same, and 87 is a roller carried by the split casting and operating in the cam 85ª, and 88 is a supplemental roller, the function of both of said rollers being hereinafter more fully described.

In the outer end of the twister sections or needles is detachably secured a spool or similar device 89, upon which is arranged to be automatically placed, a coil of wire or bobbin forming the stay section, portions of which are wrapped or coiled about the longitudinal or strand wire as the carriage or shuttle traverses the bed.

The coiling or bobbin devices will first be described: 90 refers to coiling or bobbin devices reciprocally carried on the rectangular bar 38. These coiling or bobbin devices are arranged to receive in a suitable manner the stay or woof wire A, fed from any suitable supply, which first passes between the grooved wheels 47, and then is fed to, and in a manner to be described formed into a coil or bobbin B, in the coilers 90, see Fig. 32; said coil B containing a predetermined length of wire to form the transverse stay-section to connect adjacent strand-wires. In the movement of the carriage or shuttle as it rises to the uppermost point in the bed, the outer ends of the twister sections or shuttles which move in a path directly beneath the coiling devices or bobbin formers, see Fig. 35, engage the same with such force as to slightly raise the bar 38 and simultaneously with such raising, mechanism is brought into action for moving the coilers or bobbin formers laterally on their support 38 in such a manner as to cause the coil or bobbin therein or thereon to engage with the spools or bobbin retainers 89 arranged in the twister sections or needles, and a coil or bobbin is made so that when the carriages or shuttles are caused to be reciprocated, the stay wire section B, which is the bobbin, will, as it becomes coincident with each of the successive warp, longitudinal or strand wires C, be caused to be wrapped or coiled about the same, and at certain points in the movement of the carriage or shuttle, severing devices will be brought into play for severing from the length of stay wire, a stay-section so that the end of the stay-wire, which is inserted through the bobbin former, will be left free preparatory to making another coil or bobbin which is accomplished during the movement of the carriage or shuttle from its lowermost point in the bed to the starting point at the top. These coil forming devices have a predetermined movement, governed by the engagement of the clutch parts 142 and 143 of the clutch 48, which are controlled by the operation of the rod 53 through the engagement of the roller 57 with the track 58. The location of the roller 57 with respect to the gear 29 is such that the roller 57 will engage the track 58 before the gear 29 leaves the internal-ring-gear 5, see Fig. 48, when said gear is nearing the end of ring-gear 5, which will cause the clutch parts 142 and 143 to engage, but operate the shaft 41 in a reverse direction for withdrawing the stay wire preliminary to its first coil formation, and when said gear 29 reaches the segmental rack 6, it will be understood that the movement of shaft 41 will be reversed or caused to operate in a direction to feed the stay wire forward so as to form the coil or bobbin B, and such operation will continue until the gear 29 leaves segment gear 6 and enters into meshing relation with ring-gear 5, by which time the shuttle has been raised or advanced to a position to receive the coil or bobbin.

As the carriage or shuttle goes down or travels from bobbin receiving position to a point where the wrapping of the stay section is completed, the lugs 68ª, see Figs. 8 and 10, on the gear 67, engage the devices 78, permitting the clutch parts 69 and 70, (to the right of the center of Fig. 8) to engage and operate the shaft 66, which in turn will actuate or rotate the gear wheel 85, causing the stay-section to be wrapped or coiled about a strand or warp wire C. This operation will bring the lugs 68ª below or on the underside of the then coincident devices 78, or into a position similar to that in which they are shown in Fig. 10, which will permit the carriage or shuttle to descend or move a distance equal to the space between adjacent devices 78, when the lugs 68ª will engage or come into contact with the next adjacent or succeeding device 78, when the coiling or wrapping operation will go on as before. When the carriage or shuttle reaches the opposite or lowermost point in the bed, the chain 73 will be reversed and there is enough play of the gear 67 so that it will rotate sufficiently to move the lugs 68ª out of the path of the devices 78, while at the same time, the lugs 69 and 70 (to the left of the center of Fig. 8) will clutch, allowing the carriage or shuttle to ascend or be moved from inoperative to operative position.

The action of the cam 85 through the roller 87 is to cause the casting 82 to be swung outwardly on its pivot, being the shaft 64, so that the twisting device or needle 84 may engage each successive strand or warp wire, causing the stay section to be coiled or wrapped about the same. Such a movement of the cam and the split casting will cause the rollers 88 to engage with the open slotted ways 35 in the bed. This is a safe guard to prevent the carriage or shuttle from moving during the wrapping or coiling of the stay-section or woof wires B with the strand or warp wires C, and the continued rotation of the cam is such as to move the twisting sections or needles away from the strand or woof wire after the wrap or coil has been made to permit the carriage or shuttle to continue its course to the lower or opposite end of the bed.

Referring to the coiling or bobbin forming device 90 carried by the bar 39, it is designed to have four of such coiling or bobbin forming devices for each carriage or shuttle for the reason that each carriage or shuttle carries two castings 82 in which are seated twister sections or needles 84, and these twisters or needles are provided for carrying the coil or bobbin retainers or spools 89 upon opposite ends which coincide and also co-act with the coilers or bobbin formers 90. The coiling device or bobbin former is provided with a groove 96, a guide 97, and a feeder 98, see Figs. 23 and 45. The feeder 98 is carried adjacent to the grooved feeding wheel 47 for the reception of the wire which is fed thereto and the wire is then directed through the groove 96 and formed into a coil or bobbin between the guide 97 and oblique guide plate 97ª. The shafts 41 and 42 which rotate for a given period have a pre-determined movement as before stated which governs the amount of wire fed into the bobbin former.

99 is a pivoted guiding block carried within the body of the bobbin former having an actuating face forming a part of the groove 96 and the same is held in an adjusted position by means of the adjusting pin 100, this is for the purpose of contracting or expanding the opening of the groove and to somewhat guide the direction of the wire as it is formed into a bobbin or coil. When describing one bobbin former, it is understood that all are of a similar construction and may be dovetailed in the manner shown on the bar 38 to have a sliding relation thereon or may be attached in any other suitable manner, and a pair of bobbin formers are carried adjacent to each other as shown in the figures so as to have the coils or bobbins arranged opposite to each other and the feeders 98 in their normal position in front of the feed wheels 47. As has been suggested the coil or bobbin formers are moved laterally on the bar 38 when contacted with by the twisting sections or needles, and this is accomplished as follows: As the carriages or shuttles are raised the twisting device or needle 84 engages with the bobbin former 90 and the bar 38 sufficiently to raise the bar 38 which will cause the bobbin former and its guide plates 97 and 97ª to be seated in the receiving space 124 of the needle, see Fig. 35. The twisters or needles 84 engaging the bobbin formers will cause the rollers 101 of the coil or bobbin formers 90 to engage a wedge shaped casting or arm 102 attached to the frame 36 and through such engagement, said coil or bobbin formers will be moved sidewise, or into the position shown in Fig. 36, depositing or shoving the coils or bobbins B onto the spools or bobbin retainers 89, see Figs. 33 and 34, which receive the coil or bobbin, and the parts of the machine then being in position for the carriage or shuttle to reverse its movement will descend or move away from the bobbin formers, permitting the bar 38 to drop or return to its normal position, when means will be brought into play for shifting or returning the bobbin formers to the position shown in Fig. 35. The mechanism for showing the return of the bobbin formers to their normal position is best seen in Figs. 26 and 27.

103 indicates an operating rod which at its lower end has a pivotal connection with a free end of the swinging arm 55 which is shown fulcrumed at 55ª to the frame 56 and the upper end of the rod 103 has a pivotal connection with a short lever 104 suitably attached to a rocking arm or rod 105 having bearing on the frames 34 and 36 as shown in Figs. 26 and 29. Attached to the rod 105 is an arm or lever 106, and 107, 108 and 109 are similar arms or levers to that of 106 which have a pivotal relation with the frame 36 and connecting the levers 106 and 108 is a rod 110 and connecting the lever 106 with an extension of the lever 107 is a rod 111, and connecting the extension of the lever 107 with an extension of the lever 109 is a rod 112. It will be seen that when the bobbin formers have been shifted by action of the carriage or shuttle and its twisting sections or needles the operating rod 103 is actuated by its being depressed through the action of the arm 55 the levers 106, 107, 108 and 109 through the action of the rod 105 and through component rods they will be caused to engage the bobbin formers and move them again into their normal positions and to insure a return of the rod 105 for readjusting the levers 106, etc., a spring 113 has been provided coiled around and attached to the rod 105 and secured to the frame 34 (shown in Fig. 29) for returning the levers into their normal position as shown in Fig. 26. The levers 106, 107, 108 and 109 are so carried or disposed relative to the bobbin formers 90 that when operated in manner described will engage and return the formers 90 to their initial position, see Fig. 35.

The severing device or devices to which reference has been made will now be described, and it is understood that the devices described are provided in a series to co-act with each of the coil or bobbin formers, for severing the wires A which pass through said formers and immediately after the coils or bobbins have been deposited onto the twister sections or needles and at a time when the carriage or shuttle has moved slightly in its downward movement. The cutters are referred to as 114 114ª and may be of any suitable form to accomplish the purpose herein. The parts 114 of the cutters are supported on the spindles 115 having bearing on the support 36 at 116 and on the upper ends of said spindles there is provided a beveled pinion 117. The parts 114ª, with which the parts 114 coöperate to sever a wire, are supported on or are attached to brackets 114ᵇ slidable on the bars 38, best seen in Figs. 37 and 38, which said figures are best suited to disclose the functions of said cutters. The brackets 114ᵇ are moved through engagement of the needles 84, when the carriages or shuttles are raised so as to allow the needles to pass to position to receive the bobbins or stay sections B, and as the needles are moved to cause the stays to be connected to the strand wires, the brackets 114ᵇ, are, by suitable means, such as a spring or other means, not shown, moved to operative position, see Fig. 37, so that the parts 114 will have a shearing action against the parts 114ª. The means for actuating the parts 114 of the cutters or severing devices through the spindles 115 is by means of a series of beveled pinions 118 arranged in the manner shown in Figs. 7 and 25 to intermesh with the beveled pinions 117. The pinions 118 are carried by a transverse shaft 119 supported in brackets 120 from the frames 36 and on one end of the shaft 119 is arranged a worm wheel 121. And the means for transmitting power to the pinions 118 on the shaft 119 is through a worm 122 carried on the upper end of the shaft hereinbefore described as 27, on the lower end of which, is carried the beveled wheel 27ª which intermeshes with the bevel gear 28 carried by the cross driving shaft 25. The shaft 27 is arranged somewhat out of line with the bearing of the worm 122 and it is therefore necessary to provide knuckle-joints 123 in the length of the shaft at desirable points for the perfect operation of the worm for driving the shaft 119, the upper end of the shaft 27 has a bearing on the frame 36. These devices are illustrated in Fig. 28 as well as in Fig. 25. The gearing for operating the cutters is so timed relative to the formation of the coils or bobbins and the shuttles, that said cutters will not operate to sever a wire A until after the first wrap or coil of the stay section B about a warp, strand or longitudinal wire, so as to insure holding the end of the stay section during the successive operations of coiling or wrapping the stay sections about the line wires.

Referring to the twister sections or needles 84 having a bearing in the casting 82, said needles are provided with segmental pinions 86 intermittently actuated through the rotation of the toothed cam wheel 85. These needles are provided with depressions or bobbin receiving seats 124, previously referred to in one end of which it is designed to secure the spools or bobbin receivers 89, from which the wire is uncoiled during the downward movement of the carriage or shuttle for wrapping the stay section around each succeeding strand or warp wire and the said needles are provided with the longitudinal slotted portions 125 which are in position to engage or embrace the strand or warp wires as the frame 82 supporting the needles is moved outwardly into line with the strand or warp wires through the action of the cam wheel 85.

The coil retainers or spools 89 are similar to that shown in Fig. 24, the same having the offset portions 126 to be seated in the depressions or seats 124 of the twisters or needles and the extended plate portions 127 by means of which said retainers or spools are secured to the needles. Each of the retainers or spools 89 are provided with the spring-held fingers or detents 128 having a pivotal relation at 129 as shown in Fig. 24 and retained in such position by means of the springs 130 which are secured thereto and to a post 131 in the body of the retainers or spools 89, or rather to a cap 133 which is attached to the offset 126 and covers the main body portion of the fingers 128. The fingers or detents 128 have projecting points 132 extending beyond the body of offset 126 of the retainers or spools 90, see Figs. 39 and 40, and arranged so that as the twisters or needles are raised through the action of the carriage or shuttle, the main body of the coil or bobbin formers 89, will extend down into the depressions or seats 124 of the twisters or needles and will remain in such position until the body of the bobbin formers and the frame 38 are engaged, when through the upward motion which is imparted to the frames 38 which will cause the rollers 101 of the formers to engage the frames 102 in manner described, the formers will be shifted laterally and automatically deposit the bobbins therein on extension 126 of the coil retainers or spools 89. As the bobbins are shoved on to the coil retainers or spools, the fingers 128 will be shoved inwardly until the body of the bobbin has passed beyond the projections 132 when the fingers 128 will be released and resume the position shown in Fig. 24 retaining the coil or bobbin on the coil retainers or spools 89, which will prevent the wire or bobbin from flirting during the operation of wrapping the stay-section on the warp wires, after which the carriage recedes from the formers and the severing device is brought into action, and severs the stay-section from the stay wire in manner explained.

Referring to the plate portions 127 of the spools or coil retainers 89, see Fig. 24, the inner faces of said plates are recessed or cut out, as at 155, which, as shown in plan in Fig. 24 and in perspective in Figs. 41, 42 and 43, leaves one side, as at 156, much narrower than the other side, which for convenience has been designated as 157, and said plates 127 are split or divided as at 157ª to a point central of the spool, which corresponds to the open space 125 in the needles for the reception of the strand or warp wires. When the bobbin carrier 89 with its plate 127 is attached to or secured in place on the twister or needle, as shown in Figs. 41, 42 and 43, an opening or space 158 is left between the narrow portion 156 and the end of the needle and the object of or the function of such opening or space 158 is to allow or permit the stay wire section B, during the first half revolution of the needle, see Fig. 41, to pass out through such opening or space 158, and through the split portion 157ª, and to be directed or deflected onto the outside of the spool 89 by the bevel or tapered face 159 on the plate 127 of the spool or retainer 89 together with the bevel or tapered edge 160 of the needle adjoining such bevel edge 159 of the plate 127.

Referring to the frame supports 10, it is designed to carry clamping blocks in their faces for the purpose of retaining the strand or warp wires in position as they are fed to the rotary frame and during the operation of wrapping the stay sections thereon, and means has been provided for separating the clamping blocks at the point where the fabric is drawn away from the machine and to retain the blocks in such a position until the loose strands have been again seated therein. The strand or warp wires which are placed at graduated distances apart are fed in any suitable manner to the rotating frame from any suitable source of supply, and extending around the frame are directed away therefrom adjacent to the point of feeding the wires thereto, so that, it will be understood as each successive shuttle comes into alinement to cause its stay-section to be wrapped about the strand or warp wires, and after the shuttles have made a complete rotation with the frame the fence fabric will be drawn away from the frame by any suitable pullout and wound in a suitable manner on a core, wrapper, reel, or other device. The frame supports 10 are provided with the ways 134 extending from the top thereof to a point near the bottom, when the ways are widened, as shown at 135, and 136 is a groove in the ways extending from the top of the uprights to the intersection of the widened portions 135 therein. In these ways it is designed to carry a series of clamping blocks 137 which are dovetailed in the grooves 136 and the upper block of the series is fast to the uprights and the lower blocks which are referred to as 138 are held yieldingly against their adjacent blocks by means of a spring 139 bearing against the bottom of the block 138 and the ring 8 of the frame. By means of these springs the blocks of the series are yieldingly forced into contact with each other, or when wires are slipped or passed between the said blocks, the springs insure that the blocks firmly impinge the said wires. As the frame rotates and brings the uprights into position where it is designed to direct the fabric away from the frame a roller 140 which is carried by the blocks 137 which are dovetailed in the supported in a suitable manner from the frame 15 which will depress the block and therefore cause the separation of the blocks in the inner series of the uprights then in position and permit the fabric to be directed away from the clamping device and the roller is retained in such a position and the blocks held apart a given length of time to permit the free ends of the strand wires then being fed to the machine to be seated between the clamping blocks, when the roller moves away from the track 141, and the spring 139 will again force the blocks to impinge upon the body of the fabric. These devices are clearly illustrated in Fig. 30.

It will be seen that the machine embodies a structure including means for continuously feeding forward a plurality of strand wires, mechanism for continuously feeding forward a plurality of stay wires from which stay-sections are severed and that said stay-sections are connected to or wrapped about the strand wires by coiling members during the advance of the strand wires. Said coiling members are movable in the direction of feed of the strand wires and are adapted to receive the stay-sections during the uninterrupted operation of advancing said strand wires, making the operation of the machine a continuous one as a whole in completing the fence by attaching the transverse stay-sections to the longitudinal or strand wires.

The operation will be understood from the foregoing description, but briefly is as follows:—The strand wires C are fed to the machine from any suitable source of supply and directed in a manner to be engaged by the clamping blocks 137 and 138 which grip and continuously feed forward said strand wires. The stay wires A, which are supported in a suitable manner to move with the stay feeding devices, are threaded between the wheels 47 and the feeder 98 to the bobbin formers 90. Assuming that a shuttle with its twisters or needles 84 has received a stay wire coil and said coil has been severed from the feed wire A, after the first wrap of the stay section on a longitudinal wire, the shuttle will successively present the stay section to and wrap the same about the strand wires, by which time the shuttle has traversed the bed and during which time the gear 29 has traveled from one end of the ring-gear 5 to the other end thereof, but just prior to said gear 29 reaching the leaving end of ring-gear 5, the roller 57 will have engaged and started to travel over the track 58 which will operate the rod 53 throwing in clutch part 143, setting in motion shaft 41, but in a reverse direction. Such operation of the shaft 41 will cause the feed rollers 47 to withdraw the straightened end of the stay wire A, projecting below the formers 90 to a position preparatory to forming another coil or bobbin. The reverse operation of the feed rollers 47 is very slight; first, because there need be but very little retraction of the stay wire A, and second, because the gear 29 will travel but a short distance from the last-mentioned position before it enters into meshing relation with segment rack 6, which will operate to reverse the movement of the feed wheels 47, or operate them to advance the stay wire A, and start the formation of another coil or coils. During the travel of gear 29 along the rack 6, the shuttle is being moved to operative position on the frame, while at the same time the coil or coils are being formed. When the shuttle is moved to engaging position with the formers 90, said formers are raised causing the rollers 101 to engage the cam block 102 which will move the formers in opposite directions resulting in the coils or bobbins B being deposited on the spools 89 of the needles 84, when the shuttle is again ready to attach another stay section to the strand wires, during the initial movement of which, the severing device operates to sever the stay length from the stay wire.

During the travel of gear 29 from one end of the ring-gear 5 to the other end thereof, the shuttles are moving from operative to inoperative position attaching the stay section to the strand wires, and during the travel of the gear 29 from one end of the segment gear 6 to the other end thereof, the shuttles are moving from inoperative to operative position. After the bobbin formers 90 have been shifted to a position to deposit a stay section on the needles, they remain in such position until the roller 57 engages the track 58, when the rod 103 and component parts will be actuated to return the bobbin formers 90 to normal position.

The parts 114 of the cutters operate approximately continuously and are so timed in their operation that they make about one revolution during each complete rotation of the frame.

What we claim is—

1. A machine for the manufacture of wire fencing, comprising a rotating frame, a series of coiling members mounted for reciprocation in said frame, and means for rotating said frame and for actuating said members.

2. A machine for the manufacture of wire fencing, comprising a revolving frame, a series of coiling members mounted for reciprocation in said frame, means for actuating the revolving frame, and means for advancing a series of said members in one direction and a series in an opposite direction and for actuating the same during the rotation of the revolving frame.

3. A machine for the manufacture of wire fencing, comprising a revolving frame, a series of shuttles arranged in said frame and reciprocated therein during the rotation of the frame, coiling members carried by said shuttles, and means for actuating the frame and imparting movement to the shuttles.

4. A machine for the manufacture of wire fencing, comprising a revolving frame, two or more shuttles mounted for reciprocation in said frame and during the rotation thereof, means for imparting a stopping and starting movement to said shuttles, and means for rotating the frame and for reversing the movements of the shuttles.

5. A machine for the manufacture of wire fencing, comprising a revolving frame, a series of intermittently revolved coiling members carried thereby and supported by frames reciprocally arranged in the revolving frame, means for actuating the revolving frame, means for reciprocating the frames carrying said members, and means for actuating said members when the frames carrying the same are reciprocated in one direction, and for holding them stationary when moving in the opposite direction.

6. A machine for the manufacture of wire fencing, comprising a revolving frame, a series of coiling members mounted to reciprocate during the rotation thereof, means for actuating said members, a coil forming device, means for automatically placing a coil on the coiling members, means for actuating the frame, and means for feeding a wire to the coiling members.

7. A machine for the manufacture of wire fencing, comprising a series of reciprocally arranged shuttles mounted in a revolving frame, duplicate coiling members for each shuttle, coil retainers carried by said shuttles, automatic coil forming devices, means for automatically detaching the coil from the coil forming devices and depositing the same on to the coil retainers, means for rotating the frame, and means for intermittently actuating the coiling members.

8. A machine for the manufacture of wire fencing, comprising a revolving frame, two or more reciprocally arranged shuttles therein, one or more coiling members carried by said shuttles, means for actuating the revolving frame, means for reciprocating the shuttles therein, and means for intermittently actuating the coiling members.

9. A machine for the manufacture of wire fencing, comprising a revoluble frame, a base, means for actuating said frame, a series of coiling members arranged in said frame, means carried by the base and engaged by devices on the revolving frame for intermittently actuating said members and for advancing them alternately in opposite directions in the revolving frame during the rotation of said frame.

10. A machine for the manufacture of wire fencing, comprising a revoluble frame, a base, means for actuating the frame, coiling members slidably arranged in the frame, devices on the base engaged by mechanism in the revolving frame for advancing a given number of members in one direction and the remainder of the series in an opposite direction during the rotation of the frame, and mechanism for intermittently rotating said members.

11. A machine for the manufacture of wire fencing, comprising a revoluble frame, a base, a series of uprights forming a part of said frame, a series of shuttles slidably arranged on said uprights, power devices carried by the base, mechanism at the base of the uprights co-acting with the power devices and with mechanism carried by the shuttles, intermittently actuated coiling members on the shuttle, and means for actuating said coiling members.

12. A machine for the manufacture of wire fencing, comprising a revoluble frame, a series of intermittently revolved coiling members carried thereby, clamping devices on said frame for engaging strand wires, coil forming devices for forming a coil, means for depositing such coil on the coiling members, mechanism whereby such coil is in turn caused to be successively coiled about the strand wires, and means for actuating the rotating frame.

13. A machine for the manufacture of wire fencing, comprising a revoluble frame, means for actuating the frame, clamping devices supported by uprights on the frame arranged for engaging strand wires of a fabric, coiling members reciprocally arranged in the rotating frame and traveling across the path of the fabric, means for feeding a stay wire in the form of a coil to the coiling members, and means for actuating said members when they are coincident with the strands of the fabric.

14. A machine for the manufacture of wire fencing, comprising a revoluble frame, the frame having an annular ring gear engaged by power devices for rotating the frame, wire coiling members carried thereby, clamping devices arranged for impinging the strand wires of a fabric, and mechanism for actuating the coiling members.

15. A machine for the manufacture of wire fencing, comprising a revoluble frame, a base, an annular ring gear of the frame engaged by power devices for rotating the same, intermittently revolved coiling members carried by said frame, clamping devices and segmental gears on the base engaged by suitable mechanism co-acting with the coiling members for actuating the said members.

16. A machine for the manufacture of wire fencing, comprising a revoluble frame, a base, an annular ring gear on the frame engaged by power devices for actuating the same, coiling members carried by mechanism having a sliding relation during the rotation of the frame, power devices arranged at opposite ends of the path of movement of the mechanism carrying the coiling members, and means supported by the base engaged by mechanism for controlling the movements of coiling members.

17. A frame for supporting working parts for the manufacture of wire fencing, comprising an annular ring provided with gearing engaged by power devices, a stationary base, uprights attached to or forming a part of the aforesaid ring, and means for journaling the ring and uprights upon the base.

18. A frame for supporting working parts for the manufacture of wire fencing, comprising a base having an annular flange, an annular ring provided with gearing engaged by power devices, uprights supported by said ring, means for supporting the ring and uprights from the standard on the base and rolling members movable with the annular ring and bearing upon the upper edge of the flange of the base.

19. A machine for the manufacture of wire fencing, comprising a base, a revolving frame journaled on said base, uprights supported by the revolving frame, the same having slotted portions at graduated distances throughout, shuttles slidably arranged upon said uprights, coiling members, swinging members on the shuttles, and supporting said members, means for rotating the frame, means for actuating the shuttles, and means for swinging the members carrying the coiling members, and means on the frames for engaging the slotted portions of the uprights when the same are coincident.

20. A machine for the manufacture of wire fencing, comprising a rotary frame, means for actuating the frame, a series of reciprocally arranged shuttles, vertical runways for said shuttles each of which is provided with a series of slotted portions, one or more swinging members of said shuttles, coilers journaled in said members, means carried by the members arranged to engage the slots of the runways when they are coincident, mechanism for actuating the shuttles, and mechanism for intermittently rotating the coilers.

21. A machine for the manufacture of wire fencing, comprising a rotary frame, means for actuating the frame, a series of pairs of reciprocally and swingably arranged devices carried in said frame, coiling members journaled in said devices, means for imparting movement to the aforesaid devices, means for locking said devices for a short period of time after being swung, and mechanism for intermittently rotating the coiling members.

22. In a machine of the class described, a series of reciprocally arranged shuttles having bearing in a revoluble frame, means for rotating the frame, supports for said shuttles, coiling members journaled for rotation in the shuttles and arranged for the reception of a coil of wire, coil forming devices in the path of movement of the shuttles, mechanism for depositing a coil formed in the coil forming devices in the coiling members, and means for actuating the shuttles.

23. A wire fence machine, comprising a rotating frame, means for actuating the frame, intermittently revolved coiling members, reciprocating supports for said members, coil forming devices for forming a preliminary coil to be deposited on the members, means for actuating the coiling members, and severing devices for severing the wire after the reception of the coil by the said members.

24. A wire fence machine, comprising a rotating frame, power devices for actuating the same, coiling members movable on runways or supports of said revolving frame arranged to have a stop and starting movement during the rotation of the frame, coil forming devices having a predetermined movement for forming a coil of wire, means for advancing the coiling members into a position adjacent to the coil forming devices, means for depositing the coil onto the said members, and intermittently actuated severing devices.

25. In a wire fence machine, a reciprocally mounted wire receiving member, means for feeding a wire to said member, said member provided with means for coiling the wire as it is received, and means for reciprocating said member with its coil after the completion of the coil.

26. In a wire fence machine, a wire receiving member movable transverse to the direction of feed of the wire thereto, means for feeding a wire to said member, means on said member for coiling the wire as it is received, and means for reciprocating said with its coil after the completion of the coil.

27. In a wire fence machine, a wire receiving member, movable transverse to the direction of feed of the wire thereto, means for feeding a wire to said member, means on said member for causing said wire as it is received, to be formed into a loose coil, and means for reciprocating said member with its coil after the completion of the coil.

28. In a wire fence machine, a wire receiving member, a wire feed, means in connection with said member for automatically coiling the wire as it is received, a device for severing the coil from its length of wire, and means for automatically shifting said member after the completion of the coil.

29. In a wire fence machine, a vertically movable support, a plurality of wire receiving members slidably mounted on said support, to move in a direction transverse to the feed of wires thereto, means for feeding a wire to each of said members, means on each of said members for coiling the wire as it is received, and devices for severing the coils from their lengths of wire.

30. In a wire fence machine, a movable support, means for moving said support, a plurality of wire receiving members carried on said support, means for moving said members laterally with the movement of the support, a wire feed comprising grooved wheels, and means on said members for coiling the wire as it is received.

31. In a wire fence machine, the combination of one or more coil forming devices for automatically receiving and coiling a supply of wire fed thereto, severing devices suitably actuated, and means for shifting the coiler and the wire thereof into the path of the severing device.

32. In a wire fence machine, coil forming devices shiftably carried on a support, wire feeding devices having a predetermined intermittent movement, means for shifting the forming devices, and severing devices having a predetermined movement and co-acting with the forming devices.

33. In a wire fence machine, a reciprocally arranged shuttle, means for imparting movement thereto, one or more coiling members carried thereby each arranged to receive a coil of wire, coil forming devices, means for feeding and supplying wire to said forming devices, means whereby the coil forming devices may be caused to intermittently co-act with the coiling members, and severing devices carried adjacent to the coil forming devices having a predetermined movement and actuated, substantially in the manner and for the purposes described.

34. In a wire fence machine, a rotating frame, coiling members carried thereby and intermittently revolved, means for rotating said members, coil forming devices in the path of movement of said members, means for supplying a coil of wire thereto, severing devices carried adjacent to each forming device, and mechanism having a pre-determined movement controlled by the rotation of the frame for actuating the severing devices.

35. A wire fence machine, comprising a revoluble frame, a base, means for actuating the frame, coiling members carried thereby, segmental gearing on said base, a series of horizontally arranged shafts supported by the frame, devices co-acting with the aforesaid gearing for driving the horizontal shafts, and mechanism suitably driven from said shafts for rotating the coiling members.

36. A wire fence machine, comprising a rotating frame, means for actuating the same, one or more shuttles having a sliding bearing relation on the supports of said frame, a chain drive for said shuttles, a balance weight therefor, coiling members, and means for actuating the same.

37. In a wire fence machine, the combination of a rotating frame, vertically movable shuttles therein, coiling members on said shuttles, means for feeding a wire in the form of a coil to the coiling members, yieldingly held clamping devices upon opposite sides of each shuttle for retaining the strand wires and means for separating the clamping devices for releasing the strand wires.

38. In a wire fence machine, the combination of a revoluble frame, one or more shuttles movable upon vertical supports thereon, coiling members having a swingable relation with said shuttles, mechanism for causing the shuttles to alternately ascend and descend upon their supports, means for rotating the frame, and means for intermittently shifting the said coiling members and locking them at graduated points during the rotation of the frame and the reciprocation of the shuttles therein.

39. In a wire fence machine, the combination of a coiling member, a coil retainer movable with the member and arranged for automatically receiving and locking a coil of wire thereon, and means for making a coil of wire preparatory to its being received by said coil retainer.

40. In a wire fence machine, a coiling member, a swingable support for said member, means for actuating the member, one or more coil retainers supported by said member, and means carried by said retainers for holding a coil of wire.

41. In a wire fence machine, a coiling member, a swingable bearing for said member, a pinion carried by said member, a segmental gear meshing with said pinion for actuating the member, a coil retainer carried by said member, and mechanism for automatically placing a coil thereon.

42. In a wire fence machine, a coiling member, a swingable support for said member, coil retainers at opposite ends of the member, a pinion on the member intermediate its ends, and a segmental gear co-acting with said pinion and supported in the movable frames, and means for actuating said segmental gear.

43. In a wire fence machine, a shuttle movable on ways supported by a rotary frame, a split casting swingably supported on said shuttle, a segmental gear journaled in the casting, a coiling member having a bearing in the split casting and actuated through the medium of the gear, mechanism for shifting the shuttle, mechanism for actuating the gear, and wire retainers carried by the coiling members.

44. In a wire fence machine, a revoluble frame and means for actuating the same, a series of shuttles arranged for reciprocation therein, means for advancing the shuttles to the top of the rotating frame, means for returning the shuttles to the bottom of the frame and devices for holding them in such last mentioned positions for a short period when they are again raised, coiling members carried in a suitable manner by the shuttles, and intermittently actuated during the descending of the shuttles and held stationary during the ascending thereof.

45. In a wire fence machine, a coiling member having an elongated slot for the purpose herein, a segmental pinion, and depressions in its opposite ends for supporting wire retainers.

46. In a wire fence machine, the combination of a reciprocal carriage, the split casting 82 having a swinging relation thereon, a coiling member carried thereby, a segmental gear journaled in the casting and arranged for actuating said member and the same having a cam face.

47. In a wire fence machine, the combination of a reciprocal carriage movable on uprights supported upon a revoluble frame, the split casting 82 having a swingable relation with said carriage, a coiling member having a bearing in the casting, a segmental gear for actuating said member, a cam face of the gear engaged by means for the purpose herein, and a member carried by the casting for engaging depressions or slots in the uprights, mechanism for actuating the carriage and mechanism for actuating the aforesaid gear.

48. In a wire fence machine, the combination of a carriage comprising duplicate supports, transverse shafting having a bearing in said supports, and the carriage having a slidable relation with uprights of a rotating frame, coiling devices having bearing in frames having a swinging relation with one of said shafts, intermittently revolved devices for actuating the coilers, mechanism for reciprocating the carriage, and mechanism for swinging the frame supports holding the coilers.

49. The herein described carriage, comprising the support 60, transverse shafts 64, 66 and 71 and the spindle bearing 61 having a sliding relation on suitable frame supports, mechanism for alternately shifting the carriage in opposite direction, and intermittently actuated twisting sections arranged on said carriage.

50. The herein described rotating frame, supports 10, clamping devices supported in ways of the supports 10, means for yieldingly retaining the clamping devices in position for impinging wires bearing between the same, and means on the lower run of clamps arranged to engage devices during the rotation of the frame for separating the clamping devices at intervals.

51. The herein described severing devices attached to revolving spindles and actuated through the medium of beveled gears and worm gearing, the worm thereon supported on a driving shaft actuated by mechanism supported upon a revolving frame.

52. In a fence machine, the combination of a series of coil forming devices, a vertically movable support for said formers, mechanism for raising the support and simultaneously shifting the formers, a series of levers suitably actuated for returning the formers to their normal positions, and means whereby the levers assume their normal positions automatically.

53. In a wire fence machine, the combination with wire coiling devices, of wire coil formers arranged for sliding relation on a suitable support, the said formers comprising a body portion having a feeding stem, and a wire groove passing through the stem and body of the coiler, and a guiding block adjustably carried thereby.

54. A wire fence machine, comprising a rotating frame, a base, a series of shuttles arranged to reciprocate vertically in the frame and during the rotation thereof, coiling members arranged on said shuttles and intermittently rotated during the movement of the shuttles in one direction and held stationary during their opposite movement, clamping devices for impinging the strand wires of a fabric, coil forming devices for forming a preliminary coil to be automatically deposited on the coiling members, means for shifting the formers on their supports, severing devices for severing the wire after the coil has been formed, mechanism having a predetermined movement carried by the revolving frame engaging means in the base for intermittently actuating the severing device, means for rotating the frame, and mechanism for readjusting the position of the formers.

55. A machine for the manufacture of wire fencing comprising a continuously revoluble frame, a series of coilers slidably carried on said frame, means for rotating the frame, and means for actuating the coilers as the frame is revolved.

56. A machine for the manufacture of wire fencing, comprising a continuously revoluble frame, a series of intermittently revoluble coilers slidably carried on said frame, means for rotating the frame, and means for actuating the coilers as the frame is revolved.

57. A machine for the manufacture of wire fencing, comprising a rotary frame, a series of coilers carried thereby, wire engaging jaws on said frame separate from said coilers, means for rotating the frame, means for actuating the coilers, and means for operating the jaws.

58. A machine for the manufacture of wire fencing, comprising a rotary frame, coilers carried thereby, means for feeding a coil of stay wire to the coilers, and means for separating the said coil of wire from a supply.

59. A machine for the manufacture of wire fencing, comprising a frame, coilers carried thereby, means for feeding, coiling and placing a wire coil in such coilers, means for separating the said coil from a supply, and means for operating said coilers to connect said coils with a series of spaced strand wires.

60. A wire fence machine, comprising a rotating frame for advancing a series of strand wires, concentrically about its axis, stay wire feeding devices, and coilers carried by said frame to receive and connect said stay wires to the strand wires during such rotation of the frame.

61. A machine for manufacturing wire fencing, comprising a rotary frame adapted to receive and advance a series of strand wires concentrically about its axis, means for feeding mesh forming wires to said frame, and a series of successively actuated coilers adapted to receive and connect the mesh forming wires to said strand wires during the rotation of such frame.

62. A machine for manufacturing wire fencing, comprising a rotary frame adapted to receive and advance a series of strand wires, means for feeding mesh forming wires to said frame, and means reciprocally carried and movable with said frame to connect said mesh forming and strand wires at their points of intersection.

63. A machine for manufacturing wire fencing, comprising a rotary frame, means carried thereby adapted to receive and advance a series of strand wires, means for feeding mesh forming wires to said frame, and means independent of the strand wire receiving means aforesaid for connecting the mesh forming and strand wires in transit.

64. A wire fence machine, comprising a rotating frame, coilers movable in pairs lengthwise and rotatable with said frame, strand wire feeding devices, means for feeding mesh forming wires to said coilers, and means for actuating the coilers to connect the strand and mesh forming wires.

65. In a wire fence machine, a support, a wire receiving member slidably carried on said support, wire feeding devices, means on said member for coiling the wire as it is received, means for shifting said member after the formation of a coil, and means for returning said member.

66. In a wire fence machine, a movable support, a plurality of wire receiving members slidably arranged on said support, wire feeding devices, means on each of said members for coiling the wire as it is received, means for moving said support, and means engaging said members when said support is moved for sliding said members on said support.

67. In a wire fence machine, a movable support, a plurality of wire receiving members carried by said support, rollers attached to each of said members, means for moving said support, means engaged by the rollers when the support is moved, for shifting said members on the support, and wire feeding and guiding devices in connection with each of said members.

68. In a wire fence machine, the combination of a wire receiving member, a wire feed, means on said member for coiling the wire as it is received, a traveling coiler, and means for automatically depositing the coil formed on the member on to said coiler.

69. In a wire fence machine, the combination of a plurality of wire receiving members, a wire feed, means on each of said members for coiling the wire as it is received, a traveling coiler, means on said coiler for receiving the coils formed on the members, and means for automatically depositing said coils on to said coiler.

70. In a wire fence machine, the combination of a movable support, a plurality of wire receiving members slidably mounted on said support, a wire feed, means on said members for coiling the wire as it is received, a traveling coiler, said coiler adapted to have engagement with said support for moving the same, means for shifting the members on the support as it is moved, and means for depositing the coils of the members on to the coiler.

71. In a wire fence machine, the combination of a revoluble frame, coiling members mounted on said frame, means for automatically forming loose coils of wire on said frame, and means for automatically depositing said coils on to said coiling members, during the movement of said frame.

72. In a wire fabric machine, the combination with a weaving drum, of weaving mechanism mounted thereon and arranged to be operated by the movement of the drum.

73. In a wire fabric machine, the combination with a rotary weaving drum, of means for leading a plurality of line wires thereto, and a stay carrier coöperating with the drum.

74. In a machine for making wire fabric, the combination with a rotary drum equipped with several sets of wire connecting mechanisms, of means for leading line wires to the drum, and a stay carrier associated with said drum.

75. In a machine for making wire fabric, the combination with means for advancing a series of line wires, of a stay carrier movable with the line wires, and means movable with the carrier for connecting the stay and line wires during such movement.

76. A woven-wire-fence machine, comprising a frame, an upright drum mounted therein, said drum supporting a plurality of strand wires which move with said drum and concentrically about its axis.

77. A woven-wire-fence machine, comprising a frame, a rotary upright drum mounted therein, said drum carrying weaving mechanism, and forming a support for strand wires, and mechanism arranged to rotate the drum and weaving mechanism.

78. A woven-wire-fence machine, comprising a frame, a rotary upright drum against which the strand wires lie, and adapted to have the strand wires placed at intervals, so that the drum supports said strand wires, and mechanism whereby continuous rotary movement is imparted to said drum.

79. A fence machine, comprising an upright rotary device for advancing a plurality of strand wires, stay-wire feeding mechanism carried by said device and movable during the rotation of said device to successively coincide with each of said strand wires, and weaver-rotating mechanism whereby the stay-wires are connected to said strand wires.

80. A rotary-woven-wire fence machine, comprising an upright drum over which strand wires are passed in the direction of rotation thereof, weavers supported thereon carrying stay-wires, mechanism whereby said drum is rotated so as to move said weavers from one strand wire to the next succeeding one, and mechanism whereby the weavers are rotated when said weavers coincide with said strand wires.

81. A woven-wire-fence machine, comprising an upright drum, strand wire-receiving and guiding devices on said drum, means for rotating said drum, weavers mounted on said drum and arranged to carry a stay-wire from one strand wire to the next succeeding one, during the movement of the drum, and intermittently operated mechanism whereby the weavers are operated, to connect the stay-wires to the strand wires when they are coincident.

82. A rotary-woven-wire fence machine, comprising strand wire receiving and guiding devices arranged concentrically about a vertical rotary drum-supporting shaft, said devices being adapted to have strand wires passed therebetween and rest against the surface of the drum, weaver and stay-wire-carrying mechanism arranged to connect said stay-wires with said strand wires, cutting mechanism whereby the stay-wires are severed at predetermined intervals, mechanism for operating said weavers to connect the stays and strands during a partial rotation of the drum, and mechanism for holding said weavers inoperative during the remainder of the rotation of said drum.

83. A rotary woven-wire-fence machine, comprising strand wire feeding and guiding devices, stay wire-weaving mechanism, a rotary device whereby said weaving mechanism is carried from one strand wire to the next succeeding one, and weaver-rotating mechanism, whereby the stay-wires are connected to the strand wires.

84. A woven-wire-fence machine, comprising strand wire feeding and guiding devices, a rotary weaver and stay-wire carrying drum against which the strand wires lie, said stay-wires adapted to extend longitudinally of the drum and said strand wires transversely thereto, means for rotating the drum, and mechanism for intermittently operating the weavers.

85. A rotary woven-wire-fence machine, comprising wire guiding devices arranged concentrically about a rotary drum, strand wires passing between said guiding devices and resting against the surface of the drum, weaver and stay-wire carrying mechanism mounted upon the rotary drum arranged to connect said stay-wires to the strand wires.

86. A wire fence machine, comprising a rotating frame for advancing a plurality of strand wires concentrically about its axis, a plurality of weavers mounted on said frame, and adapted during the movement of the frame to coincide with each of said strand wires, means for depositing stay-wires on the weavers, and means for intermittently operating said weavers during the rotation of said frame.

87. A machine for manufacturing wire fencing, comprising a rotating frame adapted to receive and advance a plurality of strand wires concentrically about its axis, means for feeding a plurality of mesh forming wires to said frame, weavers mounted on said frame for connecting said mesh forming wires with said strand wires, and means for moving said weavers from one strand wire to the next succeeding one during the rotation of said frame.

88. In a loom for weaving wire fabric, the combination with the means for feeding the longitudinal wires continuously into the machine, of the longitudinally and transversely-movable shuttles adapted to weave the transverse wires onto said longitudinal wires, and means for driving said shuttles.

89. In a loom for weaving wire fabric, the combination with the means for feeding the longitudinal wires continuously through the machine, of the shuttles carrying the bobbins which form the transverse wires, means for carrying said shuttles through the machine coincident with the movement of the fabric, means for moving the shuttles transversely of the fabric across the longitudinal wires, and means for driving said shuttles to cause them to wrap the transverse wires around the longitudinal wires.

90. In a machine for weaving wire fabric, the combination with means for carrying the longitudinal wires through the machine, of means for successively introducing the cross-wires into the machine and stringing them transversely of the longitudinal wires, and means for wrapping the transverse wires around the longitudinal wires while said longitudinal wires are moving through the machine.

91. In a machine for the purpose set forth, the combination with the continuously moving clamp-bars having jaws for clamping the longitudinal wires, of the shuttles adapted to move longitudinal with the movement of the fabric and to cross the fabric transversely, said shuttles being adapted to wrap the transverse wires around the longitudinal wires between said clamp-bars during the continuous passage of the fabric through the machine.

92. In a machine for the purpose set forth, the combination with the means for carrying the longitudinal wires into the machine, of a series of shuttles adapted to travel longitudinally of the machine with said wires and transversely thereof, each of said shuttles carrying a rotary needle adapted to embrace the longitudinal wires and wrap the transverse wires thereon, means for dropping said needle on to the longitudinal wires and raising it therefrom, and means for rotating said needles when embracing said wires.

93. In a machine for weaving wire fabric, the combination with the means for carrying the warp-wires into the machine, of a shuttle adapted to move longitudinally through the machine with said wires and to cross the machine transversely during said longitudinal movement, a rotary needle in said shuttle, means for lowering and raising said needle and imparting an intermittent rotation thereto.

94. In a machine for the purpose set forth, the combination with the means for conveying the warp-wires into the machine, of a shuttle adapted to travel longitudinally through the machine with said wires and transversely thereof during said longitudinal movement, means for moving the shuttle longitudinally and transversely of the machine, said shuttle having a rotary needle adapted to embrace the warp-wires, means for successively dropping the needle on to said wires and raising it therefrom, a rotary shaft for said needle, a drive-wheel upon said shaft, an endless driving agent passing over said wheel, supporting pulleys at its opposite ends, one of said pulleys being connected with suitable driving-gears whereby motion is imparted to said driving agent.

95. In a machine for weaving wire fabric, the combination of a shuttle adapted to travel with the fabric, a vertically-movable needle in said shuttle, and means for imparting an intermittent rotation to said needle.

96. In a machine for the purpose set forth, the combination with the movable clamp-bars, jaws carried by said bars for clamping the longitudinal wires, shuttles disposed between said clamp-bars adapted to move longitudinally with the fabric and to cross the fabric transversely, said shuttles being adapted to wrap the transverse wires around the longitudinal wires between said clamp-bars.

97. In a loom for weaving wire fabric, the combination with the means for feeding the longitudinal wires through the machine, of the shuttles carrying the bobbins which form the transverse wires, means for carrying said shuttles through the machine coincident with the movement of the fabric and for simultaneously moving the shuttles transversely of the longitudinal wires, and means for driving said shuttles to cause them to wrap the transverse wires around the longitudinal wires.

98. In a machine for weaving wire fabric, the combination with the means for carrying the warp-wires into the machine, of a shuttle adapted to move through the machine with said wires and to cross the machine transversely, a rotary needle in said shuttle, means for lowering and raising said needle, and means for imparting rotation thereto.

99. In a wire-fence loom, the combination with the means for carrying the longitudinal wires continuously into the machine, of the shuttle adapted to travel across the longitudinal wires, said shuttle carrying a rotary needle adapted to embrace the longitudinal wires and provided with means at each end for holding a bobbin, whereby as the needle is rotated two bobbin-wires are simultaneously wrapped around the longitudinal wires as the shuttle passes across the loom.

100. In a wire-fabric loom, the combination with the means for carrying the longitudinal wires into the machine, of means for simultaneously introducing two stay-wires, stringing said stay-wires transversely of the longitudinal wires and simultaneously weaving the stay-wires to the longitudinal wires as said stay-wires are carried across the fabric.

101. In a wire-fabric loom, the combination of the rotary cylindrical member around which the longitudinal wires are adapted to pass, of a rotary needle adapted to travel across said longitudinal wires mounted upon said rotary cylinder, said needle being adapted to embrace each of said longitudinal wires in succession and having means for carrying a bobbin-wire at each end, means for rotating said needle to wind the bobbin-wires simultaneously onto the cross-wires as said needle is successively presented to said wires in its passage across the machine.

102. In a wire-fabric loom, the combination of the continuously-rotatable cylinder carrying the warp-wires upon the periphery thereof, of the shuttle mounted upon said cylinder and movable longitudinally thereof across said warp-wires, a slotted rotary needle-shaft carried by said shuttle, a needle at each end of said shaft adapted to carry a bobbin, means for rotating said needle and for dropping it upon and raising it from the longitudinal wires during the passage of the shuttle across the warp-wires.

103. In a machine for weaving wire fabric, the combination with the rotary agent adapted by its movement to draw the warp-wires thereon, of the shuttles and needles carried by said agent, means for reciprocating said shuttles and rotating said needles, and means for feeding the bobbin-wires to the needles as said needles pass into operative position.

104. In a machine for weaving wire fabric, the combination of the rotary agent adapted to draw the warp-wires thereon, a series of shuttles movable transversely of said agent across the warp-wires, means for carrying the shuttles across the machine and immediately returning them to their initial position, a rotary needle carried by each shuttle adapted to weave the woof-wire onto the warp-wires, means for rotating said agent, and means for reciprocating the shuttles and rotating the needles.

105. In a loom for weaving wire fabric, the combination with the rotary agent upon which the warp-wires are drawn, of shuttles upon said agent carrying a needle adapted to receive a warp-wire, means for actuating said needle to wind the bobbin carried thereby onto the warp-wires, and means carried by the needle to hold the bobbin from flirting when the needle is rotated.

106. In a loom for weaving wire fabric, the combination with the means for feeding the warp-wires into the loom, of a shuttle carrying a needle adapted to weave the bobbin-wire upon the warp-wires, and a finger upon the needle adapted to engage the bobbin-wire as the needle rotates and restrain it from flirting.

107. In a loom for weaving wire fabric, the combination of the loom and means for feeding the warp-wires into the loom, a shuttle adapted to travel across the warp-wires, a rotary needle carried by said shuttle adapted to wrap the bobbin-wire upon the warp-wires, a spool upon the needle adapted to receive the bobbin, and a spring-actuated detent in the spool having a projecting shoulder which engages the strands to hold the bobbin from flirting as the needle rotates.

108. In a loom for weaving wire fabric, the combination with the means for feeding the warp-wires into the loom, of the shuttles carrying rotary needles, means for feeding coils of bobbins into the machine, and means for presenting the bobbins in the path of the needles and threading them thereon.

109. In a loom for weaving wire fabric, the combination with the means for feeding the warp-wires into the loom, of a shuttle carrying a rotary-needle, said shuttle being adapted to travel transversely of the warp-wires and weave the stay-wire thereon, a pivoted arm in which the needle is journaled, a gear-wheel adapted to drive said needle, also journaled in said arm, and means for actuating said arm on its pivot and rotating said gear-wheel.

110. In a wire-fabric loom, the combination of a cylinder rotatable about its axis around which the longitudinal wires pass, means for introducing a stay-wire successively to the longitudinal wires on said cylinder, and means for wrapping the stay-wire sequentially around the longitudinal wires as stay-wire is strung transversely of the longitudinal wires on said cylinder during the rotation thereof.

111. In a wire fence machine, means for continuously feeding forward a plurality of strand-wires, means for simultaneously feeding a plurality of stay-wires to said strand-wires during the advance of the strand-wires, means for simultaneously severing from each stay-wire a stay-section, and means for effecting a juncture between the stay-sections and strand-wires during the advance of the latter.

112. In a wire fence machine, means for continuously feeding forward a plurality of strand wires, means for simultaneously feeding a plurality of stay-wires to said strand-wires during the advance of the strand-wires, means for severing from each stay-wire a stay-section during the advance of the strand-wires, and coilers adapted to advance coincidingly with the advance of the strand-wires and in such advance commence and complete the connecting of the stay-sections to the strand-wires.

113. In a wire fence machine, means for continuously feeding forward a plurality of strand-wires, means for simultaneously feeding a plurality of stay-sections to receiving position during the advance of the strand-wires, stay-wire severing means operating during the advance of the strand-wires, coilers adapted to advance coincidingly with the advance of the strand-wires and in such advance commence and complete the connecting of the stay-sections to the strand-wires, said stay feeding means operating to advance the stay-sections to receiving position during the return of the coilers to normal position.

114. In a wire fence machine, the combination of mechanism for continuously feeding forward a plurality of strand wires, mechanism for simultaneously feeding a plurality of stay-wires during the advance of the strand-wires, mechanism for severing each stay-wire to form a stay-section crossing the plurality of strand wires, and reciprocating mechanism for wrapping the stay-sections around the strand-wires as the strand-wires are fed forward.

115. In a wire fence machine, the combination of mechanism for continuously feeding forward a plurality of strand-wires, mechanism for continuously feeding forward a plurality of stay-wires, and mechanism for severing the advance portion of each stay-wire as the same is carried forward to form a stay-section crossing the plurality of strand-wires.

116. In a wire fence machine, the combination of a carrier for the fence fabric and for continuously feeding forward a plurality of strand wires, a plurality of feed wheels for feeding forward stay wires, and mechanism for severing stay sections from said stay wires.

117. In a wire fence machine, means for feeding forwardly a plurality of strand wires, means for feeding stay sections to receiving position during the advance of the strand wires, mechanism for severing the stay sections, and coiling members for attaching the stay sections to the strand wires, said coiling members movable in the direction of feed of the strand wires, and also transversely of said strand wires.

118. A wire fabric machine, comprising means for continuously advancing a plurality of strand-wires, means for simultaneously introducing a plurality of stay-wire sections across the strand wires, and means for wrapping portions of each stay-section around the strand wires during the continuous travel of the latter.

119. A wire fabric machine, comprising means for continuously advancing a plurality of strand-wires, means for simultaneously introducing a plurality of stay-wire sections transversely of the strand wires, and means for simultaneously effecting a juncture between the strand-wires and stay-sections by wrapping a portion of one of said wires around another during the continous travel of the strand-wires.

120. In a wire fence machine, the combination of mechanism for continuously feeding forward a plurality of strand-wires, mechanism for continuously feeding forward a plurality of stay-wires, mechanism for severing the advance portion of each stay-wire to form a stay-section, mechanism for carrying forward the stay-sections into position for connecting the same to the strand-wires, and reciprocating mechanism for coiling portions of said stay-sections around the strand-wires as the strand-wires are fed forward.

121. In a wire fence machine, the combination of mechanism for continuously feeding forward a plurality of strand-wires, means for simultaneously feeding a plurality of stay-wires from which it is adapted to sever stay-sections, a revoluble cutter for each stay-wire, means for operating said cutters in unison for severing the advance portion of each stay-wire to form a stay-section, and means for uniting the stay-sections to the strand-wires during the advance of the latter.

122. In a wire fence machine, the combination of mechanism for continuously feeding forward a plurality of strand-wires, a plurality of feed wheels for feeding forward a plurality of stay-wires, mechanism for severing the advance portion of each stay-wire to form a stay-section, and coilers adapted to advance coincidingly with the strand-wires and during such advance commence and complete the connecting of the stay-sections to the strand-wires.

123. In a wire fence machine, the combination of mechanism for continuously advancing a plurality of strand-wires, a plurality of sets of stay-wire feeding wheels, cutting mechanism for severing the advance portion of each stay-wire, when said stay-wires have advanced far enough to produce a predetermined length of stay-section, means for simultaneously advancing said stay-sections to position to be connected to the strand-wires, and coilers adapted to advance coincidingly with the strand-wires for connecting the stay-sections to the strand-wires during the advance of the latter.

124. In a wire fence machine, the combination of means for continuously advancing a plurality of strand wires, stay-wire feeding means comprising a plurality of sets of feed wheels arranged in parallel rows, cutters in advance of each pair of feed wheels, said cutters arranged to operate on and sever said stay-wires when a predetermined length of stay-section has been advanced by said feed wheels, and coiling members for connecting said stay-sections to the strand-wires during the advance of the latter.

125. In a wire fence machine, the combination of means for continuously advancing a plurality of strand-wires, stay-wire feeding means comprising a plurality of sets of feed wheels arranged in parallel rows, cutters in advance of each pair of feed wheels, said cutters arranged to operate on and sever said stay-wires when a predetermined length of stay-section has been advanced by said feed wheels, coiling members for connecting said stay-sections to the strand-wires during the advance of the strand-wires, and means for positioning said stay-sections to be engaged by said coiling members.

126. In a wire fence machine, the combination of means for continuously advancing a plurality of strand-wires, stay-wire feeding means comprising a plurality of operating shafts, a plurality of sets of feed-wheels, carried on each of said shafts, cutters coöperating with each set of feed-wheels and arranged to operate on and sever said stay-wires when a predetermined length of stay-section has been advanced by said feed-wheels, and coiling members for connecting said stay-sections to said strand wires.

127. In a wire fence machine, the combination of means for continuously advancing a plurality of strand-wires, stay-wire feeding means comprising a plurality of operating shafts, a plurality of sets of feed-wheels carried on each of said shafts, cutters cooperating with each set of feed-wheels and arranged to operate on and sever said stay-wires when a predetermined length of stay-section has been advanced by said feed-wheels, coiling members for connecting said stay-sections to the strand-wires during the advance of the strand-wires, and means for positing said stay-sections to be engaged by said coiling members.

128. In a wire fence machine, the combination of a carrier for the fence fabric and for continuously feeding forward a plurality of strand-wires, a plurality of feed wheels supported on said carrier and arranged to feed forward stay-wires during the movement of the carrier, means on the carrier for severing stay-sections from the stay-wires during the movement of the carrier, and coiling members on the carrier adapted to connect the stay-sections to the strand-wires during the movement of the carrier.

129. In a wire fence machine, the combination of a carrier for the fence fabric and for continuously feeding forward a plurality of strand-wires, stay-wire feeding means movable with the carrier and adapted to feed stay-wires during such movement, cutting means movable with the carrier and arranged to sever said stay-wires when a predetermined length of stay-section has been fed forward by said stay-feeding means, coiling members movable in the direction of feed of the strand-wires and adapted to connect said stay-sections to said strand wires, and means for delivering the stay-sections in position to be operated upon by said coiling members.

130. In a machine for making wire fabric, the combination with a rotary weaving drum, of means for leading a plurality of strand or line wires thereto, and a stay carrier coöperating with the drum and operating to deliver transverse stay-sections to the strand or line wires.

131. In a loom adapted to produce a wire fabric from a plurality of continuously moving wires, a support movable with the wires, and several rows of end coiling devices mounted on and movable with said support and operating during such movement to connect the wires at intervals by coiling the ends of a transverse wire around the strand-wires.

132. In a loom adapted to produce a wire fabric from a plurality of continuously moving wires, a support movable with the wires, and several rows of end coiling devices mounted on and movable with said support and operating during such movement to connect the wires at intervals by coiling the ends and intermediate portions of the sections of transverse wires around the strand-wires.

133. In a wire fence machine, the combination of mechanism for continuously feeding forward a plurality of strand wires, a revoluble carrier, over which the strand-wires lead, mechanism for continuously feeding forward a plurality of stay-wires, and mechanism for severing the advanced portion of each stay-wire to form a transverse stay-section crossing the plurality of strand-wires.

134. In a wire fence machine, the combination of mechanism for continuously feeding forward a plurality of strand-wires, a revoluble carrier, over which the strand-wires lead, mechanism for continuously feeding forward a plurality of stay-wires, mechanism for severing the advanced portion of each stay-wire to form a transverse stay-section crossing the plurality of strand wires, and means for carrying forward and delivering said stay-sections into position for connecting the same to the strand wires.

135. In a wire fence machine, the combination of mechanism for continuously feeding forward a plurality of strand-wires, a revoluble carrier over which the strand wires lead, mechanism for continuously feeding forward a plurality of stay-wires, mechanism for severing the advanced portion of each stay-wire to form a transverse stay-section crossing the plurality of strand-wires, means for carrying forward and delivering the stay-sections into position for connecting the same to the strand-wires, and a series of coiler heads mounted on the revoluble carrier and over the acting ends of which the stay-sections are delivered.

136. In a wire fence machine, the combination of mechanism for continuously feeding forward a plurality of strand wires, a revoluble carrier over which the strand wires lead, mechanism for continuously feeding forward a plurality of stay-wires, mechanism for severing the advanced portion of each stay-wire to form a transverse stay-section crossing the plurality of strand-wires, means for carrying forward and delivering the stay-sections into position for connecting the same to the strand wires, a series of coiler heads mounted on the revoluble carrier and over the acting ends of which the stay-sections are delivered, and means for revolving the series of coiler heads simultaneously for coiling portions of said stay-sections around the strand wires.

137. In a wire fence machine, the combination of mechanism for continuously feeding forward a plurality of strand wires, a continuously revoluble carrier over which the strand wires lead, a plurality of coiling mechanisms mounted on and revoluble with the carrier, and mechanism for continuously feeding forward a plurality of stay wires simultaneously with the travel of the strand wires.

138. In a wire fence machine, the combination of mechanism for continuously feeding forward a plurality of strand-wires, a continuously revoluble carrier over which the strand-wires lead, a plurality of coiling mechanisms mounted on and revoluble with the carrier, mechanism for continuously feeding forward a plurality of stay-wires simultaneously with the travel of the strand-wires, and means coöperating with the feeding mechanism for the stay-wires and operating to sever the advanced portion of each stay-wire to produce a stay length crossing the plurality of strand-wires.

139. In a wire fence machine, the combination of mechanism for continuously feeding forward a plurality of strand-wires, a continuously revoluble carrier over which the strand wires lead, a plurality of coiling mechanisms mounted on and revoluble with the carrier, mechanism for continuously feeding forward a plurality of stay-wires simultaneously with the travel of the strand-wires, means coöperating with the feeding mechanism for the stay-wires and operating to sever the advanced portion of each stay-wire to produce a stay length crossing the plurality of strand-wires, and a movable support for each stay length operating to carry forward and deliver the stay length into position on a coiling mechanism on the carrier for the same to be connected or coiled around the strand wires.

140. In a wire fence machine, the combination of mechanism for continuously advancing a plurality of strand-wires, mechanism for continuously advancing and at the proper time severing a plurality of stay-wires into stay lengths, means for delivering the stay lengths to a coiling mechanism, a coiling mechanism consisting of a series of coiler heads, each head having a longitudinal slot receiving thereinto a strand-wire, a continuously revoluble carrier on which the coiler heads are mounted, and means for rotating said coiler heads to coil portions of said stays around the strand wires.

141. In a wire-fence machine, the combination, with the main frame and means for supporting a plurality of running-wires, of a stay-wire-bobbin carrier, means for moving said carrier step by step transversely of the running-wires, a plurality of stay-wire bobbins, means carried by the carrier for supporting said stay-wire bobbins, means for simultaneously revolving the bobbins about any running-wire, and means for severing the stay-wires from the bobbins.

142. A machine for making wire fabric, including means for longitudinally moving the longitudinal wires of the fabric continuously, a device mounted in connection with said means movable therewith for weaving cross wires with the longitudinal wires, and a guide-way for causing said weaving device to move transversely to all of the longitudinal wires successively.

In testimony whereof we affix our signatures, in the presence of the witnesses.

PETER SOMMER.
JOHN SOMMER.
PETER W. SOMMER.
JOSEPH W. SOMMER.

Witnesses for Peter Sommer and John Sommer:
H. G. DUNCAN,
ED PATTON.

Witnesses for Peter W. Sommer and Joseph W. Sommer:
B. ZIEGLER,
AGNES HAWLEY.

---

Copies of this patent may be obtained for five cents each, by addressing the "Commissioner of Patents, Washington, D. C."